(12) United States Patent
Nam et al.

(10) Patent No.: US 11,700,625 B2
(45) Date of Patent: Jul. 11, 2023

(54) COMPONENT CARRIER GROUP BASED SEARCH SPACE SET GROUP SWITCHING

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/184,168

(22) Filed: Feb. 24, 2021

(65) Prior Publication Data

US 2022/0272708 A1     Aug. 25, 2022

(51) Int. Cl.
| H04W 72/04 | (2023.01) |
| H04L 5/00 | (2006.01) |
| H04L 27/26 | (2006.01) |
| H04W 8/24 | (2009.01) |
| H04W 72/53 | (2023.01) |
| H04W 72/0453 | (2023.01) |
| H04W 72/23 | (2023.01) |

(52) U.S. Cl.
CPC ............. *H04W 72/53* (2023.01); *H04L 5/001* (2013.01); *H04L 5/0053* (2013.01); *H04L 27/26025* (2021.01); *H04W 8/24* (2013.01); *H04W 72/0453* (2013.01); *H04W 72/23* (2023.01)

(58) Field of Classification Search
CPC . H04W 72/0493; H04W 8/24; H04W 72/042; H04W 72/0453; H04W 72/53; H04W 72/23; H04L 5/001; H04L 27/26025; H04L 5/0053
See application file for complete search history.

(56) References Cited

U.S. PATENT DOCUMENTS

| 2012/0099537 A1* | 4/2012 | Leelahakriengkrai ....................... H04W 36/0072 370/329 |
| 2018/0192344 A1* | 7/2018 | Feng .................. H04W 72/042 |
| 2022/0159630 A1* | 5/2022 | Nam ................. H04W 52/0229 |

FOREIGN PATENT DOCUMENTS

WO      2020246858 A1    12/2020

OTHER PUBLICATIONS

Qualcomm Incorporated: "Potential Techniques for UE Power Saving", 3GPP Draft, 3GPP TSG-RAN WG1 #96, R1-1903016, Potential Techniques for UE Power Saving, 3rd Generation Partnership Project (3GPP), Mobile Competence Centre, 650, Route Des Lucioles, F-06921 Sophia-Antipolis Cedex, France, (Year: 2019).*

(Continued)

*Primary Examiner* — Omar J Ghowrwal
(74) *Attorney, Agent, or Firm* — QUALCOMM Incorporated

(57) ABSTRACT

Various aspects of the present disclosure generally relate to wireless communication. In some aspects, a user equipment (UE) may receive, from a base station, search space (SS) configuration information that indicates one or more component carrier (CC) groups and an SS set group configuration for each CC group of the one or more CC groups. The UE may receive, from the base station, a physical downlink control channel (PDCCH) communication on a CC included in a CC group, of the one or more CC groups, where receiving the PDCCH communication is based at least in part on switching between SS set groups, associated with the CC group, on each CC included in the CC group. Numerous other aspects are described.

30 Claims, 12 Drawing Sheets

(56) References Cited

OTHER PUBLICATIONS vol. RAN WG1, No. Athens, Greece, Feb. 25, 2019-Mar. 1, 2019, Feb. 16, 2019 (Feb. 16, 2019), XP051600713, 33 pages, Retrieved from the Internet: URL: http://www.3gpp.org/ftp/tsg%5Fran/WG1%5FRL1/TSGR1%5F96/Docs/R1%2D1903016%2Ezip [retrieved on Feb. 16, 2019], (Year: 2019).*
International Search Report and Written Opinion—PCT/US2022/070654—ISA/EPO—Jun. 7, 2022.

\* cited by examiner

COMPONENT CARRIER GROUP BASED SEARCH SPACE SET GROUP SWITCHING

FIELD OF THE DISCLOSURE

Aspects of the present disclosure generally relate to wireless communication and to techniques and apparatuses for component carrier (CC) group based search space (SS) set group switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DF-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory. The one or more processors may be configured to: receive, from a base station, search space (SS) configuration information that indicates one or more component carrier (CC) groups and an SS set group configuration for each CC group of the one or more CC groups; and receive, from the base station, a physical downlink control channel (PDCCH) communication on a CC included in a CC group, of the one or more CC groups, wherein receiving the PDCCH communication is based at least in part on switching between SS set groups, associated with the CC group, on each CC included in the CC group.

In some aspects, a method of wireless communication performed by a UE includes receiving, from a base station, SS configuration information that indicates one or more CC groups and an SS set group configuration for each CC group of the one or more CC groups; and receiving, from the base station, a PDCCH communication on a CC included in a CC group, of the one or more CC groups, wherein receiving the PDCCH communication is based at least in part on switching between SS set groups, associated with the CC group, on each CC included in the CC group.

In some aspects, a base station for wireless communication includes a memory and one or more processors operatively coupled to the memory. The one or more processors may be configured to: determine, for a UE, SS configuration information that indicates one or more CC groups and an SS set group configuration for each CC group of the one or more CC groups; and transmit, to the UE, the SS configuration information that enables the UE to perform SS set group switching on each CC included in a CC group of the one or more CC groups.

In some aspects, a method of wireless communication performed by a base station includes determining, for a UE, SS configuration information that indicates one or more CC groups and an SS set group configuration for each CC group of the one or more CC groups; and transmitting, to the UE, the SS configuration information that enables the UE to perform SS set group switching on each CC included in a CC group of the one or more CC groups.

In some aspects, a non-transitory computer-readable medium storing a set of instructions for wireless communication includes one or more instructions that, when executed by one or more processors of a UE, cause the UE to: receive, from a base station, SS configuration information that indicates one or more CC groups and an SS set group configuration for each CC group of the one or more CC groups; and receive, from the base station, a PDCCH communication on a CC included in a CC group, of the one or more CC groups, wherein receiving the PDCCH communication is based at least in part on switching between SS set groups, associated with the CC group, on each CC included in the CC group.

In some aspects, a non-transitory computer-readable medium storing a set of instructions for wireless communication includes one or more instructions that, when executed by one or more processors of a base station, cause the base station to: determine, for a UE, SS configuration information that indicates one or more CC groups and an SS set group configuration for each CC group of the one or more CC groups; and transmit, to the UE, the SS configuration information that enables the UE to perform SS set group switching on each CC included in a CC group of the one or more CC groups.

In some aspects, an apparatus for wireless communication includes means for receiving, from a base station, SS configuration information that indicates one or more CC groups and an SS set group configuration for each CC group of the one or more CC groups; and means for receiving, from the base station, a PDCCH communication on a CC included in a CC group, of the one or more CC groups, wherein receiving the PDCCH communication is based at least in part on switching between SS set groups, associated with the CC group, on each CC included in the CC group.

In some aspects, an apparatus for wireless communication includes means for determining, for a UE, SS configuration information that indicates one or more CC groups and an SS set group configuration for each CC group of the one or more CC groups; and means for transmitting, to the UE, the SS configuration information that enables the UE to perform SS set group switching on each CC included in a CC group of the one or more CC groups.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
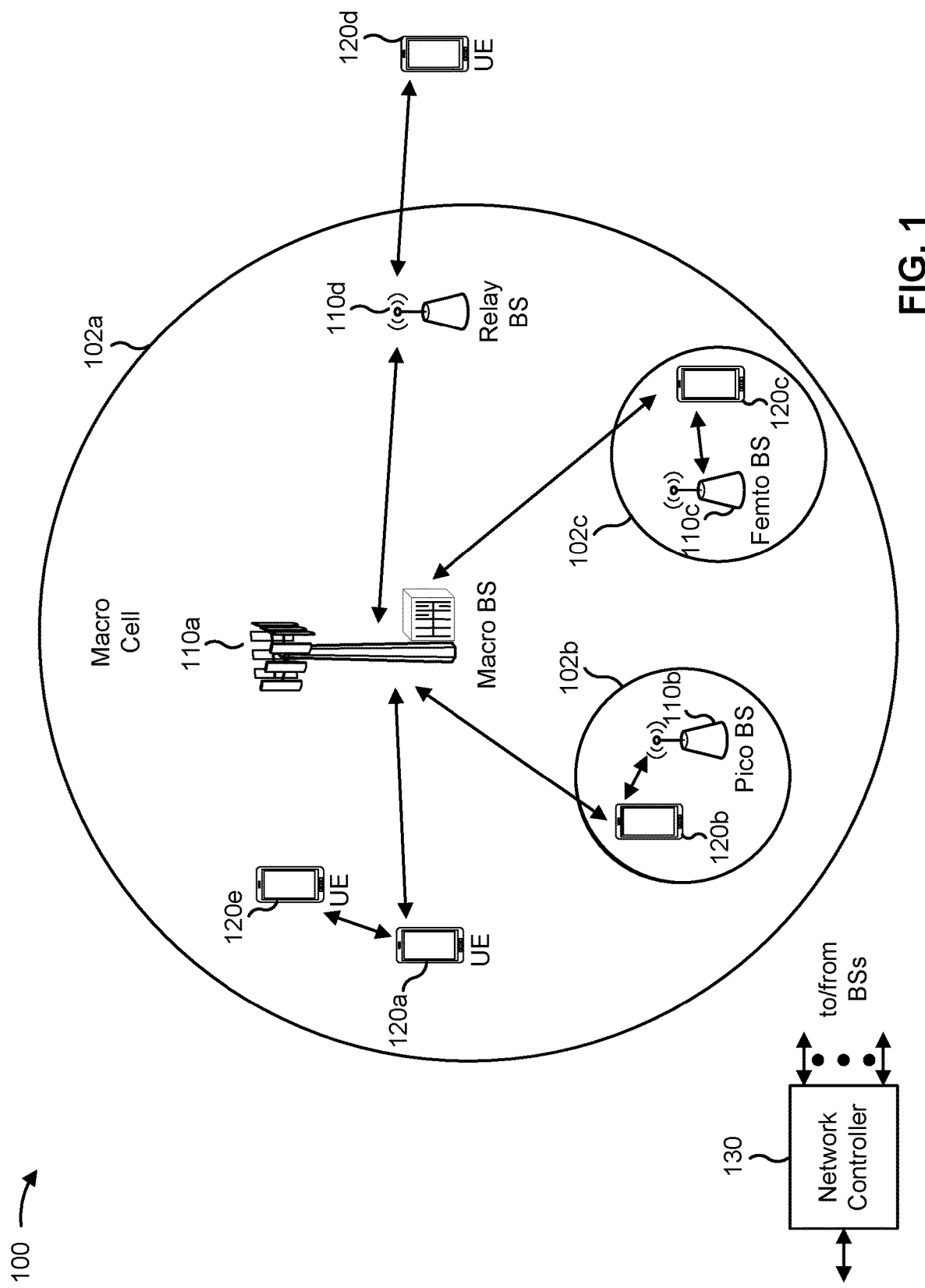
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
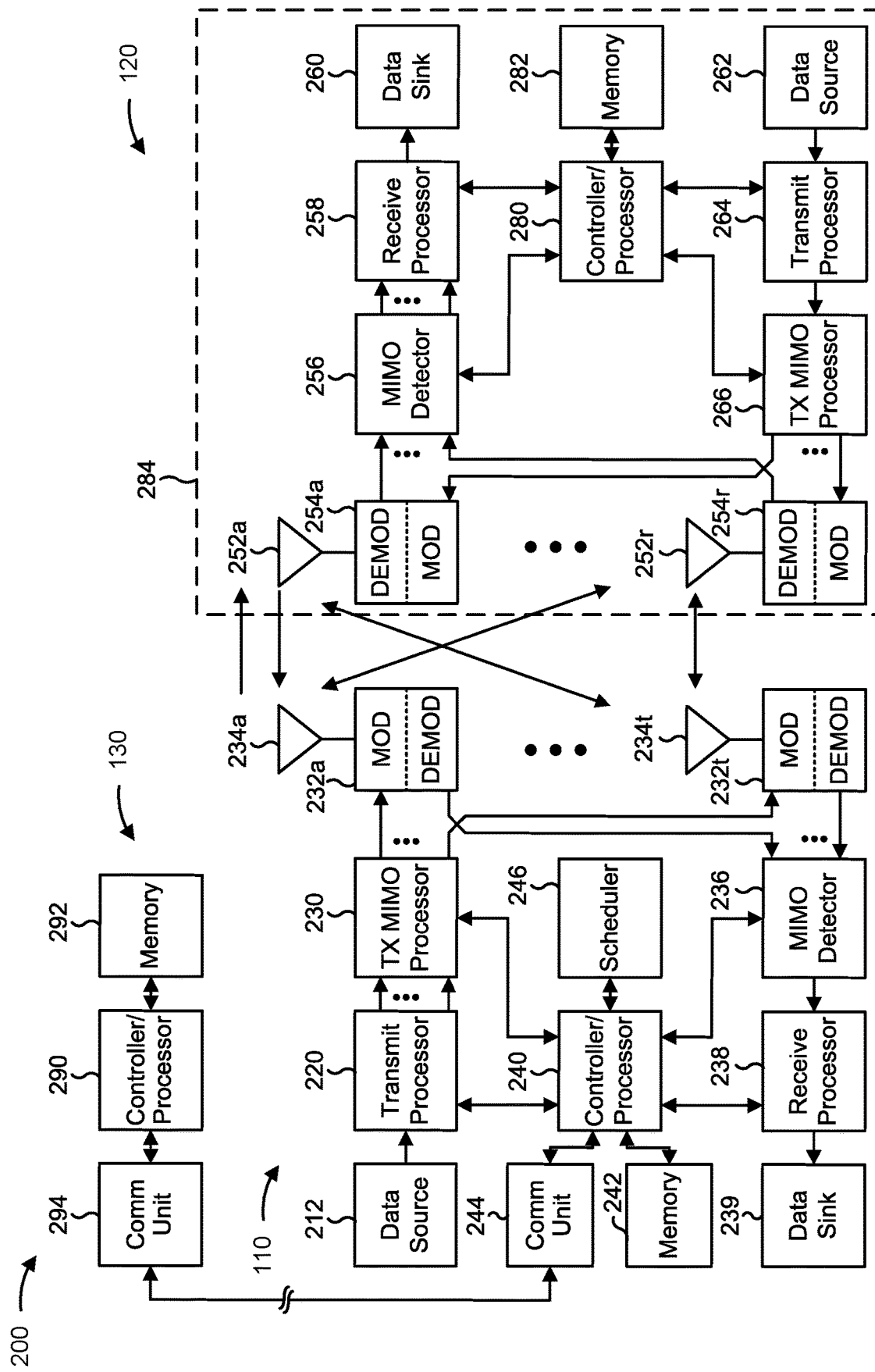
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI parameter, among other examples. In some aspects, one or more components of UE 120 may be included in a housing 284t.

Network controller 130 may include communication unit 294, controller/processor 290, and memory 292. Network controller 130 may include, for example, one or more devices in a core network. Network controller 130 may communicate with base station 110 via communication unit 294t.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7A, 7B, 8 and 9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244t. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7A, 7B, 8 and 9.

Controller/processor 240 of base station 110, controller/processor 280 of UE 120, and/or any other component(s) of FIG. 2 may perform one or more techniques associated with component carrier (CC) group based search space (SS) set group switching, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein, and/or other processes as described herein. In some aspects, executing instructions may include running the instructions, converting the instructions, compiling the instructions, and/or interpreting the instructions, among other examples.

In some aspects, the UE 120 includes means for receiving, from a base station, SS configuration information that indicates one or more CC groups and an SS set group configuration for each CC group of the one or more CC groups; and/or means for receiving, from the base station, a physical downlink control channel (PDCCH) communication on a CC included in a CC group, of the one or more CC groups, wherein receiving the PDCCH communication is based at least in part on switching between SS set groups, associated with the CC group, on each CC included in the CC group. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for monitoring, for each CC included in the CC group, a first SS set group indicated by an SS set group configuration associated with the CC group; means for identifying an indication to switch SS set groups for the CC group; and/or means for monitoring, for each CC included in the CC group, a second SS set group indicated by the SS set group configuration based at least in part on the indication to switch SS set groups for the CC group.

In some aspects, the UE 120 includes means for receiving, for the CC group, an indication of one or more SS set groups associated with the CC group, where an SS set group, of the one or more SS set groups, indicates SS sets included in the SS set group for each active bandwidth part (BWP) combination of CCs included in the CC group.

In some aspects, the UE 120 includes means for receiving, for the CC group, the SS set group configuration, wherein the CC group includes a first CC and a second CC, and the SS set group configuration indicates a first SS set group and a second SS set group, and wherein the SS set group configuration indicates, for each active BWP combination of the first CC and the second CC: a first subgroup of one or more SS sets, associated with the first CC, that are included in the first SS set group, a second subgroup of one or more SS sets, associated with the second CC, that are included in the first SS set group, a third subgroup of one or more SS sets, associated with the first CC, that are included in the second SS set group, and a fourth subgroup of one or more SS sets, associated with the second CC, that are included in the second SS set group.

In some aspects, the UE 120 includes means for receiving, for the CC group, an indication of CCs included in the CC group, wherein the CCs included in the CC group are based at least in part on a frequency band or a numerology associated with the CCs included in the CC group.

In some aspects, the UE 120 includes means for transmitting, to the base station, an indication of CCs to be included in the CC group via a UE capability message or a UE assistance information message.

In some aspects, the UE 120 includes means for receiving, from the base station, an indication to switch SS set groups for the CC group from a first SS set group associated with the CC group to a second SS set group associated with the CC group, wherein the indication identifies at least one of: a CC group index associated with the CC group, or an SS set group index associated with the second SS set group.

In some aspects, the base station 110 includes means for determining, for a UE, SS configuration information that indicates one or more CC groups and an SS set group configuration for each CC group of the one or more CC groups; and/or means for transmitting, to the UE, the SS configuration information that enables the UE to perform SS set group switching on each CC included in a CC group of the one or more CC groups. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for determining, for the CC group, one or more SS set groups to be associated with the CC group; and/or means for determining, for an SS set group of the one or more SS set groups, one or more SS sets included in the SS set group for each active BWP combination of CCs included in the CC group.

In some aspects, the base station 110 includes means for determining that CCs of the UE that are associated with a same frequency band or that have a same numerology are to be included in a same CC group.

In some aspects, the base station 110 includes means for receiving, from the UE, an indication of CCs to be included in the one or more CC groups via a UE capability message or a UE assistance information message; and/or means for determining the one or more CC groups based at least in part on the indication of CCs to be included in the one or more CC groups.

In some aspects, the base station 110 includes means for determining, for the CC group, an SS set group that includes a first SS set group and a second SS set group, wherein the CC group includes a first CC and a second CC; and/or means for determining, for each active BWP combination of the first CC and the second CC, that the SS set group includes: a first subgroup of one or more SS sets, associated with the first CC, that are included in the first SS set group, a second subgroup of one or more SS sets, associated with the second CC, that are included in the first SS set group, a third subgroup of one or more SS sets, associated with the first CC, that are included in the second SS set group, and a fourth subgroup of one or more SS sets, associated with the second CC, that are included in the second SS set group.

In some aspects, the base station 110 includes means for determining, for an SS set group associated with the CC group, SS sets to be included in the SS set group based at least in part on one or more parameters associated with the SS sets.

In some aspects, the base station 110 includes means for transmitting, to the UE, an indication to switch SS set groups for the CC group from a first SS set group associated with the CC group to a second SS set group associated with the CC group, wherein the indication identifies at least one of: a CC group index associated with the CC group, or an SS set group index associated with the second SS set group.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
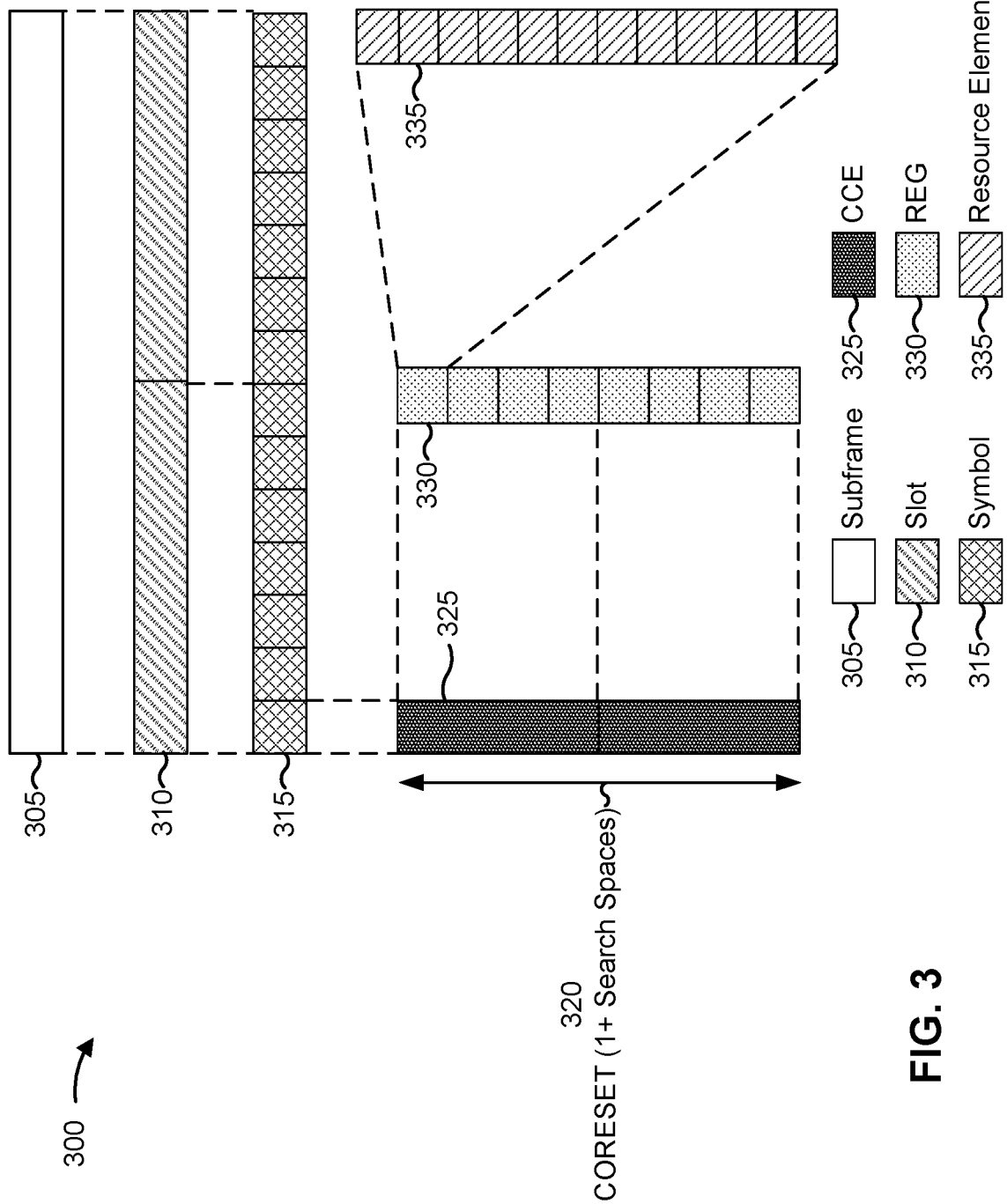
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORE-SET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

Figure 4:
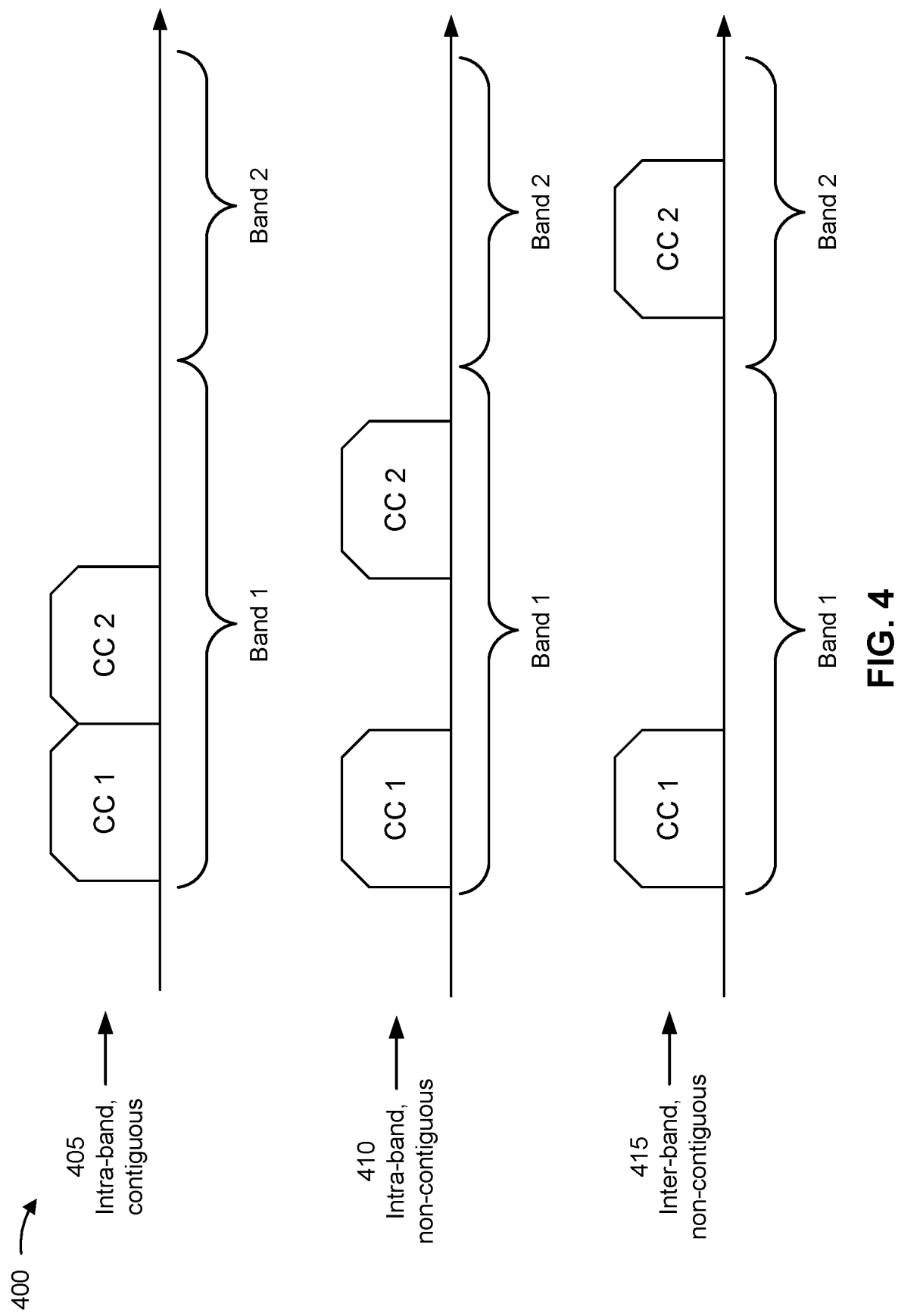
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a RRC message, DCI, and/or another signaling message.

As shown by reference number 405, in some aspects, carrier aggregation may be configured in an intra-band contiguous mode where the aggregated carriers are contiguous to one another and are in the same band (e.g., the same frequency band). As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). A CC associated with a primary carrier may be referred to as a primary component carrier (PCC). A CC associated with a secondary carrier may be referred to as a secondary component carrier (SCC). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4t.

Figure 5:
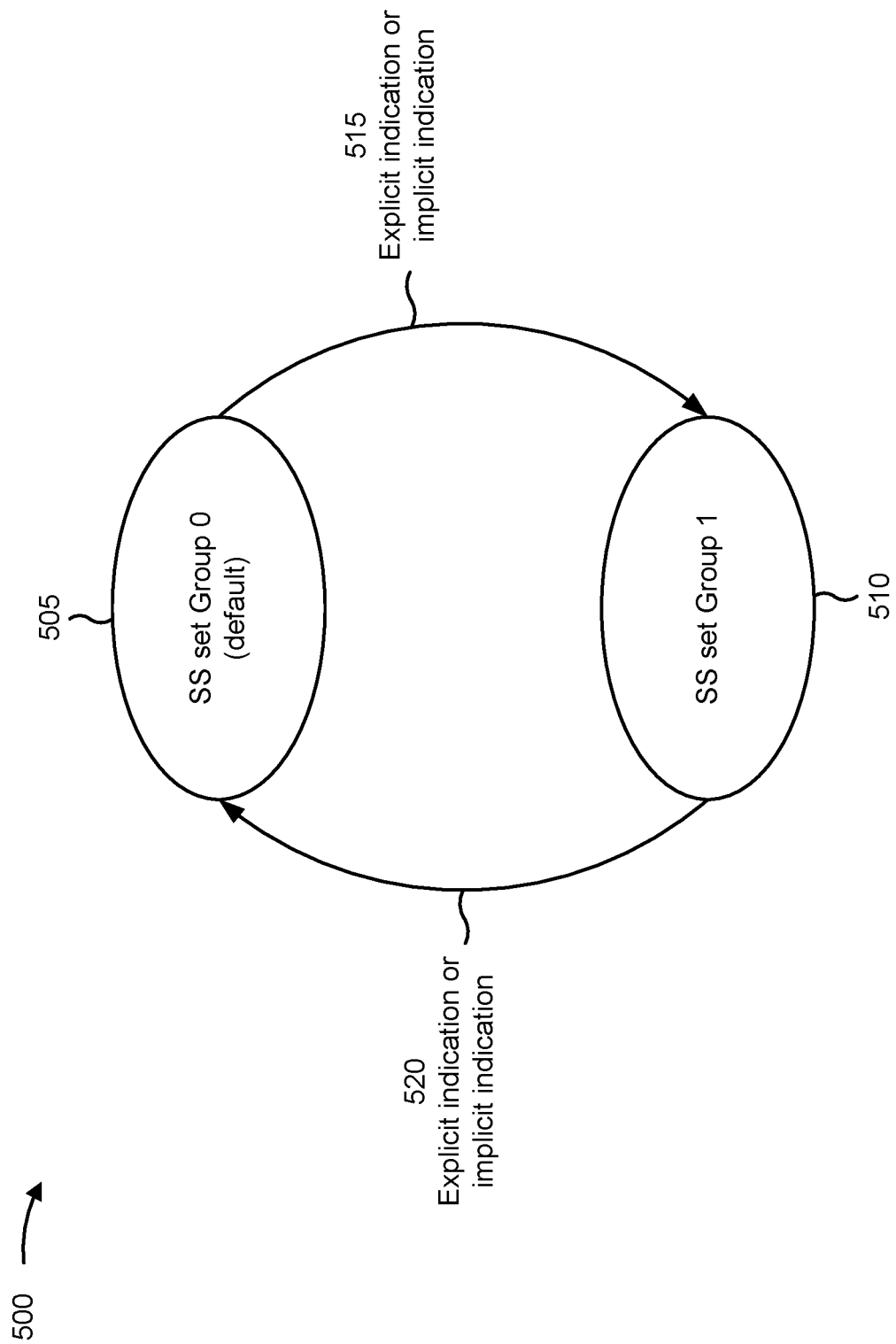
FIG. 5 is a diagram illustrating examples of search space (SS) set group switching, in accordance with the present disclosure.

FIG. 5 is a diagram illustrating examples 500 of search space (SS) set group switching, in accordance with the present disclosure. A UE may conduct data communications with a base station in a wireless network, such as wireless network 100. The data communications may include downlink communications from the base station to the UE and may include uplink communications from the UE to the base station. Adequate reception of the downlink communications by the UE, and adequate reception of the uplink communications by the base station may be crucial for the data communications. This is because the UE may utilize information included in the downlink communications to perform communication operations related to the data communications. For instance, the downlink communications may include DCI such as, for example, a resource block assignment, an OFDM symbol assignment, and/or a modulation and coding scheme, which the UE may utilize to receive and decode the downlink payload data.

As described above in connection with FIG. 3, a UE may monitor PDCCH candidates in one or more SS sets and may successfully decode one or more PDCCH candidates to receive a downlink communication (e.g., DCI). An SS set may be associated with one or more SS set groups, which may include a first SS set group 505 (e.g., Group 0) and a second SS set group 510 (e.g., Group 1). In an unlicensed frequency band spectrum, a base station may only transmit control information and data information after successfully acquiring a channel. For example, in a shared or unlicensed frequency band, a transmitting device may contend against other devices for channel access before transmitting on a shared or unlicensed channel to reduce and/or prevent collisions on the shared or unlicensed channel. To contend for channel access, the transmitting device may perform a channel access procedure, such as a listen-before-talk (or listen-before-transmit) (LBT) procedure or another type of channel access procedure, for shared or unlicensed frequency band channel access.

The channel access procedure may be performed to determine whether the physical channel (e.g., the radio resources of the channel) is free to use or are busy (e.g., in use by another wireless communication device such as a UE, an IoT device, or a wireless local area network (WLAN) device, among other examples). The channel access procedure may include sensing or measuring the physical channel (e.g., performing a RSRP measurement, detecting an energy level, or performing another type of measurement) during a channel access gap (which may also be referred to as a contention window (CW)) and determining whether the shared or unlicensed channel is free or busy based at least in part on the signals sensed or measured on the physical channel (e.g., based at least in part on whether the measurement satisfies a threshold). If the transmitting device determines that the channel access procedure was successful, the transmitting device may perform one or more transmissions on the shared or unlicensed channel during a transmission opportunity (TXOP), which may extend for a channel occupancy time (COT).

The first SS set group 505 may be associated with a time before initiation of a COT. To enable frequent channel access opportunities before initiation of COT, the UE may monitor the PDCCH candidates in the SS sets associated with the first SS set group 505 with a first periodicity. The second SS set group may be associated with a time after initiation of COT. The UE may monitor the PDCCH candidates in the SS sets associated with the second SS set group with a second periodicity, which may have a longer period with respect to the first periodicity. In other words, in a shared or unlicensed frequency band, to enable frequent channel access opportunities, the UE may monitor SS sets associated with the first SS set group 505 to enable the UE to monitor PDCCH candidates more frequently. After initiation of the COT, the UE may monitor PDCCH candidates with a longer period (e.g., less frequently) to improve power savings as the UE and the base station have acquired the channel.

In a licensed frequency spectrum, the UE may be configured with the first SS set group 505 and the second SS set group for power savings (e.g., rather than to enable frequent channel access opportunities as in the unlicensed frequency spectrum). For example, in a licensed frequency spectrum, a default SS set group (e.g., the first SS set group 505) may be associated with a longer periodicity than the second SS set group 510. In other words, the UE may be configured to monitor PDCCH candidates with a longer periodicity in a default state (e.g., associated with the first SS set group 505) and may switch to monitoring PDCCH candidates with a shorter periodicity (e.g., associated with the second SS set group 510) to improve communication performance (e.g., to improve throughput and/or to reduce latency). For example, the UE may switch from the first SS set group 505 to the second SS set group 510 when there is a scheduled communication to improve performance associated with the scheduled communication. When there are no scheduled communications, the UE may switch to the first SS set group (e.g., the default SS set group) to improve power savings. In some cases, the UE may be configured with more than two SS set groups. For example, the UE may be configured with a third SS set group that includes SS sets associated with a third periodicity (e.g., that is different than a periodicity of the first SS set group 505 and the second SS set group 510).

At a given time, one of the SS set groups may be active. In other words, at a given time, the UE may monitor the PDCCH candidates in the SS sets associated with the first SS set group 505 or the PDCCH candidates in the SS sets associated with the second SS set group 510. Further, the PDCCH communications between the base station and the UE may be switched from taking place in the first SS set group 505 to taking place in the second SS set group 510, and vice versa.

As shown by reference number 515, communication may be switched from taking place in the first SS set group 505 to taking place in the second SS set group 510. The indication of the switch may be explicit or implicit. An explicit indication may include an indication in a DCI communication (e.g., a bit in a DCI format 2_0, format 0_1, format 0_2, format 1_1, and/or format 1_2, as defined, or otherwise fixed, by a 3GPP Specification), a DCI wakeup signal (e.g., an indication in a DCI format 2_6), and/or a medium access control (MAC) control element (MAC-CE) communication, among other examples. An implicit indication may include that the UE successfully decoding a PDCCH communication (e.g., if the UE successfully decodes a PDCCH communication, then the UE may switch SS set groups). In some aspects, the implicit indication can be signaled based at least in part on Layer 1 signaling, control information, or messaging (e.g., the indication can be implied by an ACK/NACK associated with a previous transmission). In some aspects, the implicit search space configuration set switching may be pre-configured (e.g., agreed upon by the UE and the base station) upon an RRC connection, establishment, and/or reestablishment, that dictates one or more rules for switching the search space configuration set based on an implicit indication.

As shown by reference number 520, communication may be switched from taking place in the second SS set group 510 to taking place in the first SS set group 505. As described above, the indication to switch from the second SS set group 510 to the first SS set group 505 may be an explicit indication (e.g., in a DCI and/or MAC-CE message) or an implicit indication. In some aspects, the implicit indication to switch to the default SS set group (e.g., the first SS set group 505) may be based at least in part on a timer. In some aspects, the implicit indication to switch to the default SS set group (e.g., the first SS set group 505) may be based at least in part on end of a COT (e.g., in an unlicensed frequency band).

Upon switching SS set groups, the UE may switch from monitoring the PDCCH candidates in the SS sets associated with the first SS set group 505 to monitoring the PDCCH candidates in the SS sets associated with the second SS set group 510. Similarly, when the PDCCH communications are switched from taking place in the second SS set group 510 to taking place in the first SS set group 505, the UE may switch from monitoring the PDCCH candidates in the SS sets associated with the second SS set group 510 to monitoring the PDCCH candidates in the SS sets associated with the first SS set group 505.

As a result, the SS set group configuration may improve channel access opportunities before initiation of COT for a UE operating in an unlicensed frequency band. Additionally, or alternatively, the SS set group configuration may improve power savings for a UE operating in a licensed frequency band.

As indicated above, FIG. 5 is provided as an example. Other examples may differ from what is described with regard to FIG. 5.

Figure 6:
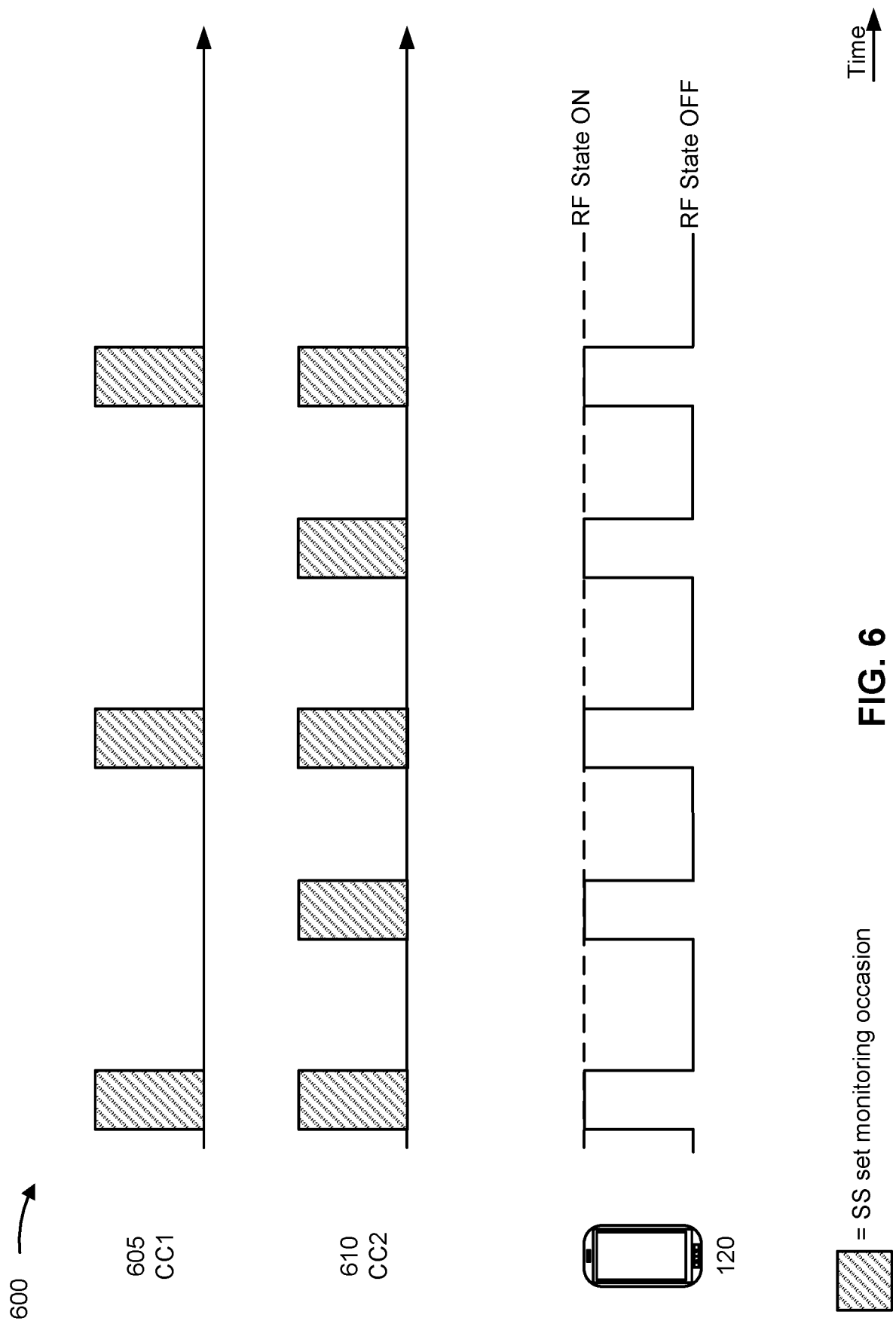
FIG. 6 is a diagram illustrating examples of SS set group switching across multiple component carriers (CCs), in accordance with the present disclosure.

FIG. 6 is a diagram illustrating examples 600 of SS set group switching across multiple component carriers (CCs), in accordance with the present disclosure. As described above in connection with FIG. 4, a UE 120 may be required to monitor PDCCH candidates on more than one CC at the same time (e.g., when carrier aggregation is configured). As described above, each CC may be associated with an SS configuration. In other words, SS sets and/or SS set groups may be independently and/or separately configured for each CC associated with the UE 120. As shown in FIG. 6, the UE 120 may be configured to monitor PDCCH candidates in a first CC 605 (CC1) and a second CC 610 (CC2).

In some cases, a UE may use common radio frequency (RF) components for monitoring PDCCH candidates in the first CC 605 and the second CC 610. For example, in an intra-band carrier aggregation configuration, the UE may use common RF components (e.g., RF front end components, Tx and/or Rx paths, ports, and/or antennas) to communicate using the first CC 605 and the second CC 610 (e.g., as the first CC 605 and the second CC 610 are included in the same frequency band). As shown in FIG. 6, when the UE 120 is configured to monitor PDCCH candidates (e.g., on the first CC 605 and/or the second CC 610) in an SS set monitoring occasion, an RF state of the UE 120 may be an on state or an active state. In the on state or the active state, the RF components of the UE 120 may be consuming power of the UE 120 to monitor PDCCH candidates, as described above. When the UE is not configured to monitor PDCCH candidates (e.g., when there is no SS set monitoring occasion on the first CC 605 or the second CC 610), the RF state of the UE 120 may be an off state or an inactive state. In the off state or the inactive state, RF components of the UE 120 may not be consuming power and/or may be in a sleep state.

As described above in connection with FIG. 5, the UE 120 may be configured to use an SS set group for power savings (e.g., an SS set group associated with one or more SS sets having a long periodicity). For example, in a licensed frequency band, the UE 120 may be configured to use a first SS set group (e.g., the first SS set group 505) for power savings and a second SS set group (e.g., the second SS set group 510) for improved communication performance. However, as described above, each CC may have an independent SS configuration. Therefore, in some cases, one CC of the UE 120 may be configured to use the first SS set group (e.g., an SS set group associated with a long periodicity), and another CC of the UE 120 may be configured to use the second SS set group (e.g., an SS set group associated with a short periodicity). As described above, the UE 120 may use common RF components to monitor PDCCH candidates for multiple CCs. Therefore, when CCs associated with common RF components are configured to use different SS set groups (e.g., SS set groups with different periodicities), then a power savings of the UE 120 may be diluted or reduced.

For example, as shown in FIG. 6, the UE 120 may use common RF components to monitor PDCCH candidates on the first CC 605 and the second CC 610. The first CC 605 may be associated with a first SS set group, and the second CC 610 may be associated with a second SS set group. In some aspects, the first SS set group may have a longer period (e.g., SS set monitoring occasions may occur less frequently) than a period associated with the second SS set group. In some aspects, the first CC 605 may have a different numerology (e.g., a different subcarrier spacing) than the second CC 610 (e.g., a slot duration of the first CC 605 may be different than a slot duration of the second CC 610). As a result, SS set monitoring occasions on the second CC 610 may occur more frequently than SS set monitoring occasions on the first CC 605. As the UE 120 shares common RF components for the first CC 605 and the second CC 610, a power savings associated with the SS set group of the first CC 605 may be diluted or reduced. For example, the UE 120 may be in an on or active RF state more frequently (e.g., than is required by the SS configuration of the first CC 605) in order to monitor PDCCH candidates on the second CC 610. Therefore, a power savings associated with an SS configuration of the first CC 605 is diluted or reduced. In some cases, secondary cell (SCell) dormancy may be configured to place one or more CCs of the UE 120 into a dormancy mode (e.g., by activating a dormant bandwidth part (BWP) for multiple CCs) in order to ensure CCs of the UE 120 that share RF components are in a dormant mode (e.g., not frequently monitoring PDCCH candidates). However, Scell dormancy requires signaling associated with BWP switching (e.g., introducing signaling overhead and a latency associated with placing the CCs in the dormant mode). Moreover, SCell dormancy is less dynamic than SS set group switching.

Some techniques and apparatuses described herein enable CC group based SS set group switching. For example, the UE 120 may be configured with one or more CC groups (e.g., which may also be referred to as cell groups). A CC group may include a PCC (e.g., a PCell) and one or more SCCs (e.g., one or more SCells). A CC group may be based at least in part on a frequency band and/or a numerology associated with CCs associated with the CC group (e.g., CCs having a same or similar numerology and/or a same or similar frequency band may be included in the same CC group). For a CC group, an SS configuration may indicate one or more SS set groups associated with the CC group. For example, an SS configuration may configure an SS set group that includes SS sets (e.g., SS set(s) for each CC included in the CC group) that are associated with the same or similar periodicity. When an SS set group switch is triggered (e.g., explicitly or implicitly) the UE 120 may be triggered to switch SS sets for each CC included in the CC group. As a result, the UE 120 may be enabled to realize the power savings benefits of an SS set configuration by simultaneously switching SS sets for each CC included in a CC group. This may ensure that an RF state of the UE 120 may remain in an off state and/or an inactive state for a longer period of time because CCs included in the same CC group may be associated with common RF components of the UE 120. Additionally, the UE 120 may be enabled to realize improved communication performance associated with an SS set configuration by simultaneously switching SS sets for each CC included in a CC group.

Figure 7A:
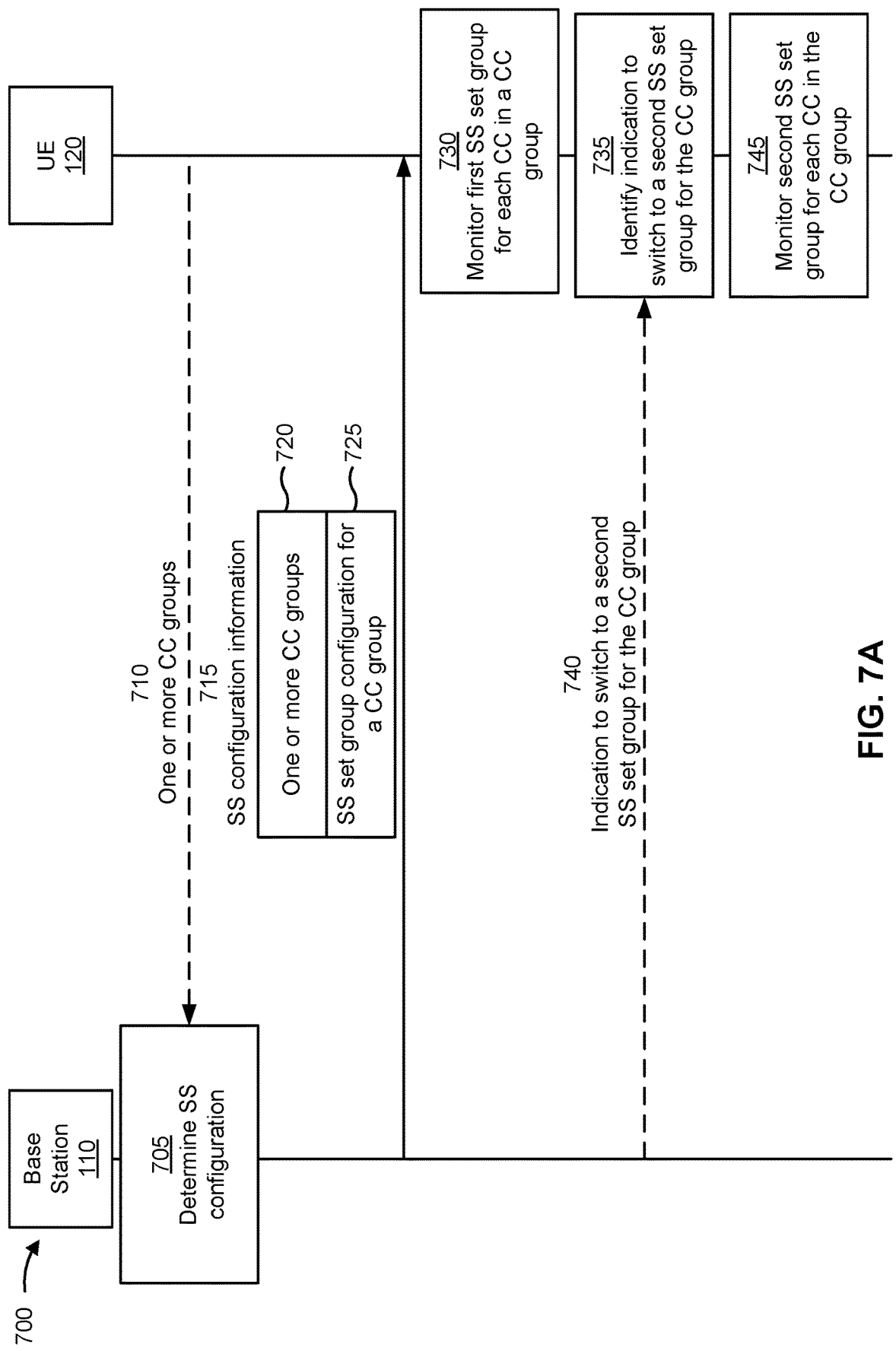
FIGS. 7A and 7B are diagrams illustrating an example associated with CC group based SS set group switching, in accordance with the present disclosure.
Figure 7B:
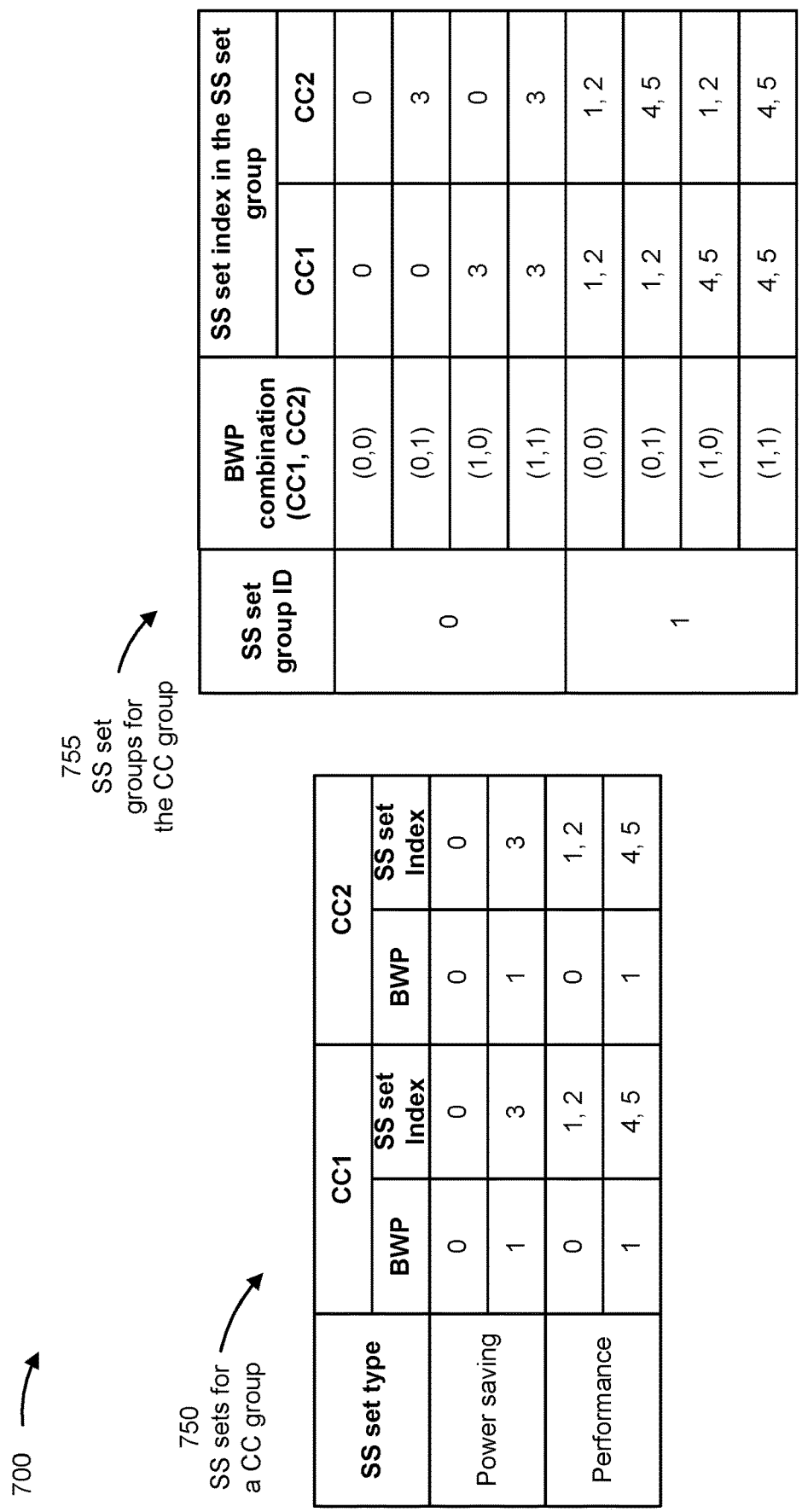

FIGS. 7A and 7B are diagrams illustrating an example 700 associated with CC group based SS set group switching, in accordance with the present disclosure. As shown in FIG. 7A, a base station 110 and a UE 120 may communicate with one another. The base station 110 and the UE 120 may be included in a wireless network, such as wireless network 100.

As shown by reference number 705, the base station 110 may determine an SS configuration for the UE 120. For example, the base station 110 may determine SS configuration information that indicates one or more CC groups and an SS set group configuration for each CC group of the one or more CC groups. The base station 110 may determine one or more CC groups based at least in part on CCs configured for, or associated with, the UE 120. In some aspects, the base station 110 may determine a CC group based at least in part on a frequency band and/or a numerology (e.g., subcarrier spacing and/or slot format) associated with the CCs configured for, or associated with, the UE 120. For example, the base station 110 may determine that CCs of the UE 120 that are associated with a same frequency band and/or that have a same numerology are to be included in the same CC group.

In some aspects, as shown by reference number 710, the UE 120 may transmit, to the base station 110, an indication of CCs to be included in one or more CC groups. For example, the UE 120 may transmit the indication of CCs to be included in one or more CC groups via a UE capability message and/or a UE assistance information message, among other examples. For example, the UE 120 may determine one or more CC groups (e.g., based at least in part on a frequency band, a numerology, and/or a carrier aggregation configuration associated with the CCs of the UE 120). The UE 120 may transmit, to the base station 110, an indication of the one or more CC groups that are determined by the UE 120. The base station 110 may use the one or more CC groups that are determined by the UE 120 to determine CC groups associated with the SS configuration for the UE 120.

In some aspects, a CC may be included in more than one CC group. For example, two CC groups may include overlapping or common CCs. In some aspects, a CC group may include one or more PCCs (e.g., associated with one or more PCells) and/or one or more SCCs (e.g., associated with one or more SCells).

The base station 110 may determine, for each CC group associated with the UE 120, an SS set group configuration. The SS set group configuration may indicate one or more SS set groups for CCs included in a CC group. For example, for a CC group, the base station 110 may determine one or more SS set groups to be associated with the CC group. For example, for a CC included in the CC group, the base station 110 may determine one or more SS sets associated with the CC to be included in the SS set group.

In some aspects, the base station 110 may determine for an SS set group associated with a CC group, one or more SS sets included in the SS set group for each active BWP combination of CCs included in the CC group (e.g., as described in more detail below in connection with FIG. 7B). In some aspects, a CC may be associated with multiple (e.g., two, three, four, or more) BWPs, one of which may be active at a time. Each BWP of a CC may be associated with one or more SS sets. As an example, an SS set group configuration may indicate a first SS set group and a second SS set group for a CC group that includes a first CC and a second CC. The base station 110 may determine, for each active BWP combination of the first CC and the second CC, that the SS set group includes a first subgroup of one or more SS sets, associated with the first CC, that are included in the first SS set group, a second subgroup of one or more SS sets, associated with the second CC, that are included in the first SS set group, a third subgroup of one or more SS sets, associated with the first CC, that are included in the second SS set group, and/or a fourth subgroup of one or more SS sets, associated with the second CC, that are included in the second SS set group.

The base station 110 may determine, for an SS set group associated with the CC group, SS sets to be included in the SS set group based at least in part on one or more parameters associated with the SS sets. The one or more parameters may include a PDCCH monitoring periodicity, a number of blind decoding candidates, a density of the blind decoding candidates, a number of CCE locations, and/or an aggregation level, among other examples. For example, the base station 110 may determine that SS sets (e.g., for CCs included in the CC group) that are associated with power savings benefit (e.g., long PDCCH monitoring periodicity and/or low number of blind decoding candidates) are to be included in the same SS set group. Similarly, the base station 110 may determine that SS sets (e.g., for CCs included in the CC group) that are associated with higher communication performance (e.g., short or dense PDCCH monitoring periodicity and/or high number of blind decoding candidates) are to be included in the same SS set group. In some aspects, the base station 110 may determine that SS sets having the same, or similar, one or more parameters are to be included in the same SS set group. For example, with reference to the example described above, the first subgroup of one or more SS sets and the second subgroup of one or more SS sets may be associated with a first one or more parameters. The third subgroup of one or more SS sets and the fourth subgroup of one or more SS sets may be associated with a second one or more parameters.

As shown by reference number 715, the base station 110 may transmit, to the UE 120, SS configuration information associated with the UE 120. As shown by reference number 720, the SS configuration information may include an indication of one or more CC groups associated with the UE 120. As shown by reference number 725, the SS configuration information may include an SS set group configuration for a (e.g., or each) CC group of the one or more CC groups. As described in more detail herein, the SS configuration information may enable the UE 120 to perform SS set group switching on each CC included in a CC group of the one or more CC groups to improve a power savings associated with performing the SS set group switching. The UE 120 may receive the SS configuration information. The UE 120 may monitor one or more SS sets on CCs included in a CC group based at least in part on the SS configuration information.

For example, as shown by reference number 730, the UE 120 may monitor a first SS set group associated with a CC group. The UE 120 may identify one or more SS sets, for each CC included in the CC group, associated with the first SS set group. In some aspects, the UE 120 may identify the one or more SS sets based at least in part on an active BWP combination (e.g., a combination of the active BWPs for each CC included in the CC group). The UE 120 may monitor PDCCH candidates associated with the identified one or more SS sets. In some aspects, the first SS set group may be a default SS set group. In some aspects, the first SS set group may be associated with a power savings benefit (e.g., SS sets included in the first SS set group may be associated with long PDCCH monitoring periodicities and/or a low number of blind decoding candidates). In some aspects, the UE 120 may receive, from the base station, a PDCCH communication on a CC included in the CC group based at least in part on monitoring SS sets included in the first SS set group.

As shown by reference number 735, the UE 120 may identify an indication to switch to a second SS set group associated with the CC group. In some aspects, the indication may be an implicit indication. For example, as described above, the UE 120 may successfully decode a PDCCH communication while monitoring SS sets included in the first SS set group. The UE 120 may identify the indication to switch to a second SS set group associated with the CC group based at least in part on successfully decoding the PDCCH communication while monitoring SS sets included in the first SS set group. In some aspects, the indication may be an explicit indication. For example, as shown by reference number 740, the base station 110 may transmit, to the UE 120, an indication (e.g., in a DCI communication and/or a MAC-CE communication) to switch to the second SS set group for the CC group. In some aspects, when the indication is an explicit indication, the indication may include a CC group index or identifier associated with the CC group (e.g., an index or identifier of the CC group associated with the SS set group switch) and/or an SS set group index or identifier associated with the second SS set group (e.g., an index or identifier of the SS set group that the UE 120 is to switch to), among other examples. This may enable the UE 120 to identify the CC group and/or the SS set group (e.g., associated with the CC group) that are associated with the SS set group switch. For example, the explicit indication may be received on one CC, such as a PCC (e.g., and not CCs included in the CC group) of the UE 120. Therefore, the CC group identifier may be used by the UE 120 to identify the CC group associated with the SS set group switching. In some aspects, such as when the explicit indication is received on a CC included in the CC group associated with the SS set group switching, the CC group identifier may not be required and/or may not be included in the explicit indication.

As shown by reference number 745, the UE 120 may monitor SS sets included in the second SS set group, on each CC included in the CC group, based at least in part on identifying the indication to switch to the second SS set group. For example, the UE 120 may monitor, for each CC included in the CC group, the second SS set group indicated by the SS set group configuration based at least in part on the indication to switch SS set groups for the CC group. As a result, the UE 120 is enabled to perform SS set group switching on a per-CC group basis (e.g., rather than on an individual CC basis or independently for different CCs). As described above, this may ensure that power savings benefits associated with an SS set group switching configuration can be realized by the UE 120 because the UE 120 is enabled to switch SS set groups for multiple CCs, that are associated with common RF components of the UE 120, simultaneously. In some aspects, the UE 120 may receive, from the base station 110, a PDCCH communication on a CC included in the CC group based at least in part on monitoring SS sets included in the second SS set group. In some aspects, the UE 120 may switch to the first SS set group or to another SS set group for the CC group (e.g., for each CC included in the CC group) based at least in part on an explicit indication or an implicit indication (e.g., an expiration of a timer and/or an expiration of a COT).

As shown in FIG. 7B, an example CC group and SS set group configuration is shown. As shown in FIG. 7B, the CC group may include a first CC (CC1) and a second CC (CC2). As shown by reference number 750, the CC group may be associated with one or more SS sets (e.g., each CC included in the CC group may be associated with one or more SS sets).

The first CC and the second CC may be associated with different SS set types. An SS set type may include SS sets associated with a power savings (e.g., associated with a long PDCCH monitoring periodicity and/or a low number of blind decoding candidates) and/or SS sets associated with improved communication performance (e.g., associated a short PDCCH monitoring periodicity and/or a high number of blind decoding candidates). As shown in FIG. 7B, the first CC may be associated with one or more SS sets associated with a first SS set type (e.g., power savings) and one or more SS sets associated with a second SS set type (e.g., performance). Similarly, the second CC may be associated with one or more SS sets associated with the first SS set type (e.g., power savings) and one or more SS sets associated with the second SS set type (e.g., performance).

The first CC may be associated with a first BWP of the first CC (e.g., indicated by index 0) and a second BWP of the first CC (e.g., indicated by index 1). Similarly, the second CC may be associated with a first BWP of the second CC (e.g., indicated by index 0) and a second BWP of the second CC (e.g., indicated by index 1). Although a BWP index for the first CC and the second CC may be the same, the BWPs may be different for each CC (e.g., the BWP index 0 is for a first BWP of the first CC and for a first BWP of the second CC). Each BWP may be associated with one or more SS sets. For example, the first BWP of the first CC may be associated with a first SS set (e.g., associated with index 0), a second SS set (e.g., associated with index 1), and a third SS set (e.g., associated with index 2). The second BWP of the first CC may be associated with a fourth SS set (e.g., associated with index 3), a fifth SS set (e.g., associated with index 4), and/or a sixth SS set (e.g., associated with an index 5). Each BWP of the second CC may be associated with SS sets of the second CC in a similar manner. As described above, although an SS set index for the first CC and the second CC may be the same, the SS sets may be different for, or specific to, each CC (e.g., SS set index 0 for the first CC may be a different SS set than SS set index 0 for the second CC).

As shown in FIG. 7B, the first CC may be associated with one or more SS sets that are associated with the first SS set type (e.g., power savings). For example, the first SS set (e.g., associated with BWP 0 of the first CC) and the fourth SS set (e.g., associated with the BWP 1 of the first CC) may be associated the first SS set type (e.g., power savings). Similarly, the first CC may be associated with one or more SS sets that are associated with the second SS set type (e.g., performance). For example, the second SS set (e.g., associated with BWP 0 of the first CC), the third SS set (e.g., associated with BWP 0 of the first CC), the fifth SS set (e.g., associated with BWP 1 of the first CC), and the sixth SS set (e.g., associated with BWP 1 of the first CC) may be associated with the second SS set type (e.g., performance). The second CC may include one or more SS sets associated with the first SS set type and/or one or more SS sets associated with the second SS set type in a similar manner as described above.

As shown by reference number 755, an SS set group configuration may be associated with the CC group described above. For example, the SS set group configuration may indicate a first SS set group, shown as SS set group identifier 0 (e.g., associated with the first SS set type), and a second SS set group, shown as SS set group identifier 1 (e.g., associated with the second SS set type). The SS set group configuration may indicate SS sets included in an SS set group for each active BWP combination for the first CC and the second CC. For example, if an active BWP for the first CC is BWP 0 and an active BWP for the second CC is BWP 1, then the first SS set group may include SS set of index 0 for the first CC and SS set of index 3 for the second CC. As another example, if an active BWP for the first CC is BWP 1, and an active BWP for the second CC is BWP 0, then the second SS set group may include SS sets of index 4 and index 5 for the first CC and SS sets of index 1 and index 2 for the second CC. As described above, the SS sets may be group based at least in part on one or more parameters associated with the SS sets to group the SS sets according to an SS set type (e.g., power savings and/or performance).

The CC group and the SS set group configuration described herein in connection with FIG. 7B is provided as an example. Other CC groups may include more CCs, CCs with a different number of BWPs, and/or CCs with a different number of SS sets, among other examples. Additionally, or alternatively, the SS set group configuration may indicate more than two SS set groups (e.g., there may be more than two SS set types). However, the different CC groups and/or different SS set group configurations may be determined and/or configured in a similar manner as described herein.

In this way, the UE 120 may be enabled to identify an SS set group for the CC group and identify SS sets for each CC included in the SS set group (e.g., based at least in part on an active BWP for each CC included in the CC group). This enables the UE 120 to switch SS set groups for all CCs included in the CC group simultaneously to ensure that a benefit (e.g., improved power savings and/or improved performance) associated with the SS set group switching can be realized by the UE 120.

As a result, the UE 120 may be enabled to realize the power savings benefits of an SS set configuration by simultaneously switching SS sets for each CC included in a CC group. This may ensure that an RF state of the UE 120 may remain in an off state and/or an inactive state for a longer period of time because CCs included in the same CC group may be associated with common RF components of the UE 120. Additionally, the UE 120 may be enabled to realize improved communication performance associated with an SS set configuration by simultaneously switching SS sets for each CC included in a CC group.

As indicated above, FIGS. 7A and 7B are provided as examples. Other examples may differ from what is described with respect to FIGS. 7A and 7B.

Figure 8:
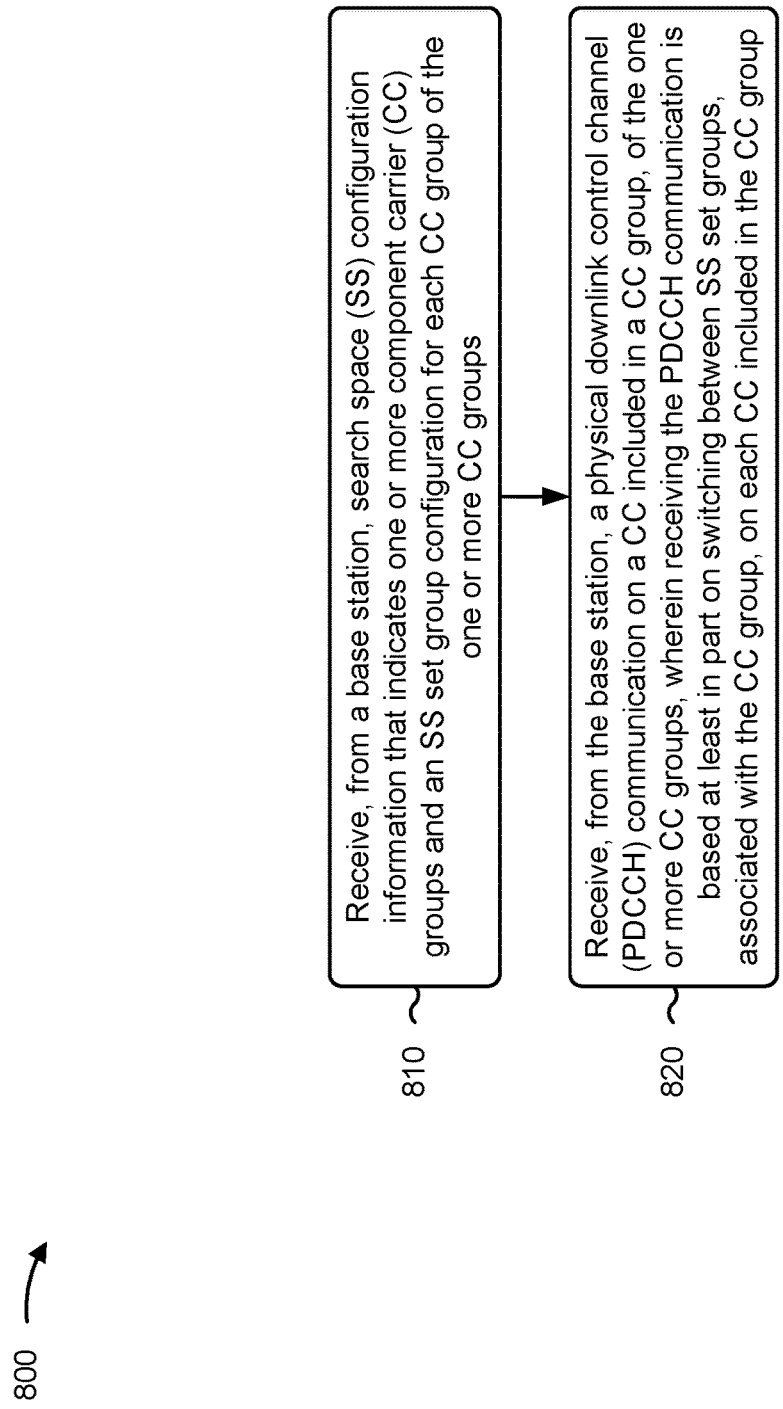
FIGS. 8 and 9 are diagrams illustrating example processes associated with CC group based SS set group switching, in accordance with the present disclosure.

FIG. 8 is a diagram illustrating an example process 800 performed, for example, by a UE, in accordance with the present disclosure. Example process 800 is an example where the UE (e.g., UE 120) performs operations associated with CC group based SS set group switching.

As shown in FIG. 8, in some aspects, process 800 may include receiving, from a base station, SS configuration information that indicates one or more CC groups and an SS set group configuration for each CC group of the one or more CC groups (block 810). For example, the UE (e.g., using reception component 1002, depicted in FIG. 10) may receive, from a base station, SS configuration information that indicates one or more CC groups and an SS set group configuration for each CC group of the one or more CC groups, as described above.

As further shown in FIG. 8, in some aspects, process 800 may include receiving, from the base station, a PDCCH communication on a CC included in a CC group, of the one or more CC groups, wherein receiving the PDCCH communication is based at least in part on switching between SS set groups, associated with the CC group, on each CC included in the CC group (block 820). For example, the UE (e.g., using reception component 1002, depicted in FIG. 10) may receive, from the base station, a PDCCH communication on a CC included in a CC group, of the one or more CC groups, wherein receiving the PDCCH communication is based at least in part on switching between SS set groups, associated with the CC group, on each CC included in the CC group, as described above.

Process 800 may include additional aspects, such as any single aspect or any combination of aspects described below and/or in connection with one or more other processes described elsewhere herein.

In a first aspect, process 800 includes monitoring, for each CC included in the CC group, a first SS set group indicated by an SS set group configuration associated with the CC group, and identifying an indication to switch SS set groups for the CC group, and monitoring, for each CC included in the CC group, a second SS set group indicated by the SS set group configuration based at least in part on the indication to switch SS set groups for the CC group.

In a second aspect, alone or in combination with the first aspect, receiving the SS configuration information comprises receiving, for the CC group, an indication of one or more SS set groups associated with the CC group, wherein an SS set group, of the one or more SS set groups, indicates SS sets included in the SS set group for each active BWP combination of CCs included in the CC group.

In a third aspect, alone or in combination with one or more of the first and second aspects, receiving the SS configuration information comprises receiving, for the CC group, the SS set group configuration, wherein the CC group includes a first CC and a second CC, and the SS set group configuration indicates a first SS set group and a second SS set group, and wherein the SS set group configuration indicates, for each active BWP combination of the first CC and the second CC a first subgroup of one or more SS sets, associated with the first CC, that are included in the first SS set group, a second subgroup of one or more SS sets, associated with the second CC, that are included in the first SS set group, a third subgroup of one or more SS sets, associated with the first CC, that are included in the second SS set group, and a fourth subgroup of one or more SS sets, associated with the second CC, that are included in the second SS set group.

In a fourth aspect, alone or in combination with one or more of the first through third aspects, the first one or more SS sets and the second one or more SS sets are associated with a first one or more parameters, and wherein the third one or more SS sets and the fourth one or more SS sets are associated with a second one or more parameters.

In a fifth aspect, alone or in combination with one or more of the first through fourth aspects, receiving the SS configuration information comprises receiving, for the CC group, an indication of CCs included in the CC group, wherein the CCs included in the CC group are based at least in part on a frequency band or a numerology associated with the CCs included in the CC group.

In a sixth aspect, alone or in combination with one or more of the first through fifth aspects, process 800 includes transmitting, to the base station, an indication of CCs to be included in the CC group via a UE capability message or a UE assistance information message.

In a seventh aspect, alone or in combination with one or more of the first through sixth aspects, process 800 includes receiving, from the base station, an indication to switch SS set groups for the CC group from a first SS set group associated with the CC group to a second SS set group associated with the CC group, wherein the indication identifies at least one of a CC group index associated with the CC group, or an SS set group index associated with the second SS set group.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
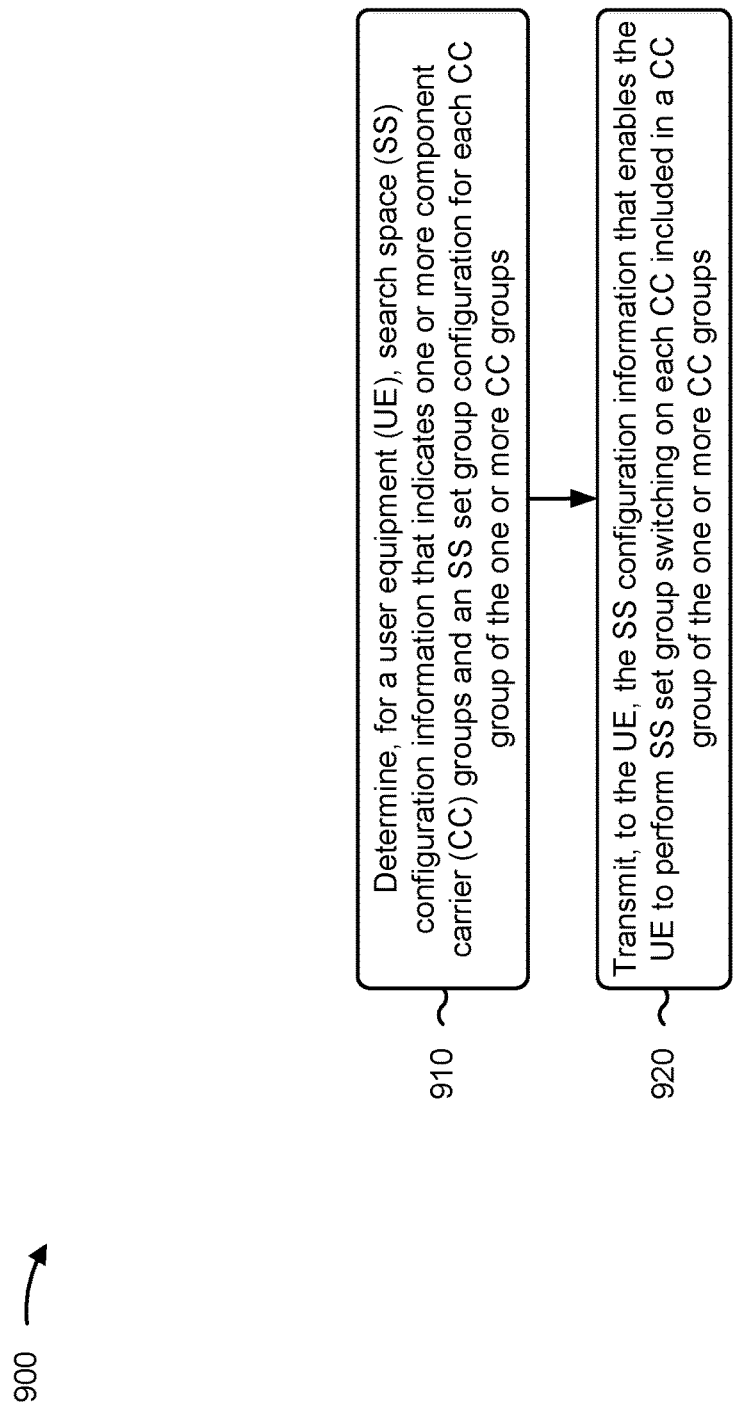

FIG. 9 is a diagram illustrating an example process 900 performed, for example, by a base station, in accordance with the present disclosure. Example process 900 is an example where the base station (e.g., base station 110) performs operations associated with CC group based SS set group switching.

As shown in FIG. 9, in some aspects, process 900 may include determining, for a UE, SS configuration information that indicates one or more CC groups and an SS set group configuration for each CC group of the one or more CC groups (block 910). For example, the base station (e.g., using determination component 1108, depicted in FIG. 11) may determine, for a UE, SS configuration information that indicates one or more CC groups and an SS set group configuration for each CC group of the one or more CC groups, as described above.

As further shown in FIG. 9, in some aspects, process 900 may include transmitting, to the UE, the SS configuration information that enables the UE to perform SS set group switching on each CC included in a CC group of the one or more CC groups (block 920). For example, the base station (e.g., using transmission component 1104, depicted in FIG. 11) may transmit, to the UE, the SS configuration information that enables the UE to perform SS set group switching on each CC included in a CC group of the one or more CC groups, as described above.

Process 900 may include additional aspects, such as any single aspect or any combination of aspects described below and/or in connection with one or more other processes described elsewhere herein.

In a first aspect, determining the SS configuration information comprises determining, for the CC group, one or more SS set groups to be associated with the CC group, and determining, for an SS set group of the one or more SS set groups, one or more SS sets included in the SS set group for each active BWP combination of CCs included in the CC group.

In a second aspect, alone or in combination with the first aspect, determining the SS configuration information comprises determining that CCs of the UE that are associated with a same frequency band or that have a same numerology are to be included in a same CC group.

In a third aspect, alone or in combination with one or more of the first and second aspects, determining the SS configuration information comprises receiving, from the UE, an indication of CCs to be included in the one or more CC groups via a UE capability message or a UE assistance information message, and determining the one or more CC groups based at least in part on the indication of CCs to be included in the one or more CC groups.

In a fourth aspect, alone or in combination with one or more of the first through third aspects, determining the SS configuration information comprises determining, for the CC group, an SS set group that includes a first SS set group and a second SS set group, wherein the CC group includes a first CC and a second CC, and determining, for each active BWP combination of the first CC and the second CC, that the SS set group includes a first subgroup of one or more SS sets, associated with the first CC, that are included in the first SS set group, a second subgroup of one or more SS sets, associated with the second CC, that are included in the first SS set group, a third subgroup of one or more SS sets, associated with the first CC, that are included in the second SS set group, and a fourth subgroup of one or more SS sets, associated with the second CC, that are included in the second SS set group.

In a fifth aspect, alone or in combination with one or more of the first through fourth aspects, determining the SS configuration information comprises determining, for an SS set group associated with the CC group, SS sets to be included in the SS set group based at least in part on one or more parameters associated with the SS sets.

In a sixth aspect, alone or in combination with one or more of the first through fifth aspects, process 900 includes transmitting, to the UE, an indication to switch SS set groups for the CC group from a first SS set group associated with the CC group to a second SS set group associated with the CC group, wherein the indication identifies at least one of a CC group index associated with the CC group, or an SS set group index associated with the second SS set group.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
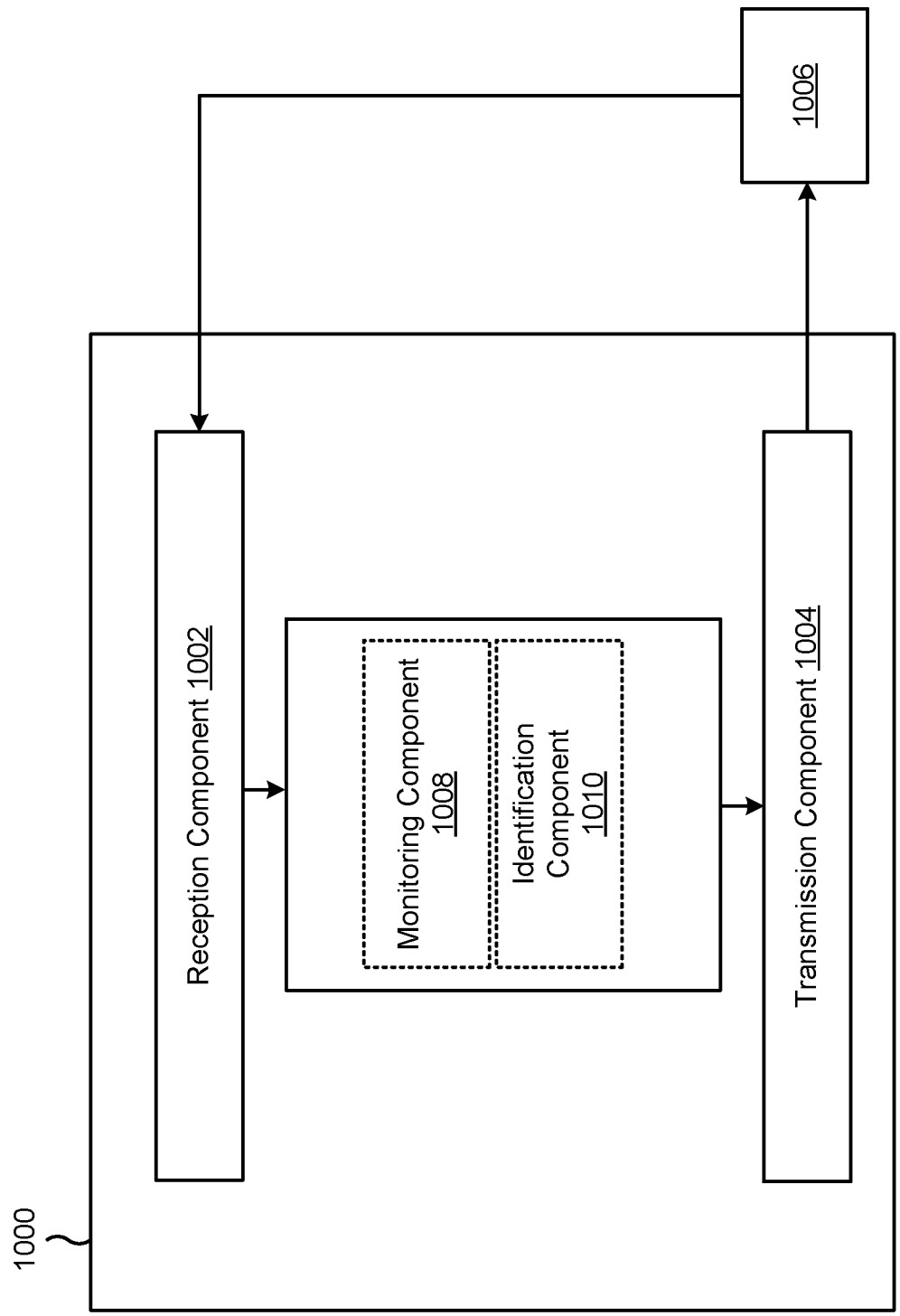
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004*t*. As further shown, the apparatus 1000 may include one or more of a monitoring component 1008, and/or an identification component 1010, among other examples.

In some aspects, the apparatus 1000 may be configured to perform one or more operations described herein in connection with FIGS. 7A and 7B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive, from a base station, SS configuration information that indicates one or more CC groups and an SS set group configuration for each CC group of the one or more CC groups. The reception component 1002 may receive, from the base station, a PDCCH communication on a CC included in a CC group, of the one or more CC groups, wherein receiving the PDCCH communication is based at least in part on switching between SS set groups, associated with the CC group, on each CC included in the CC group.

The monitoring component 1008 may monitor, for each CC included in the CC group, a first SS set group indicated by an SS set group configuration associated with the CC group. The identification component 1010 may identify an indication to switch SS set groups for the CC group. The monitoring component 1008 may monitor, for each CC included in the CC group, a second SS set group indicated by the SS set group configuration based at least in part on the indication to switch SS set groups for the CC group.

The transmission component 1004 may transmit, to the base station, an indication of CCs to be included in the CC group via a UE capability message or a UE assistance information message.

The reception component 1002 may receive, from the base station, an indication to switch SS set groups for the CC group from a first SS set group associated with the CC group to a second SS set group associated with the CC group, wherein the indication identifies at least one of a CC group index associated with the CC group, or an SS set group index associated with the second SS set group.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
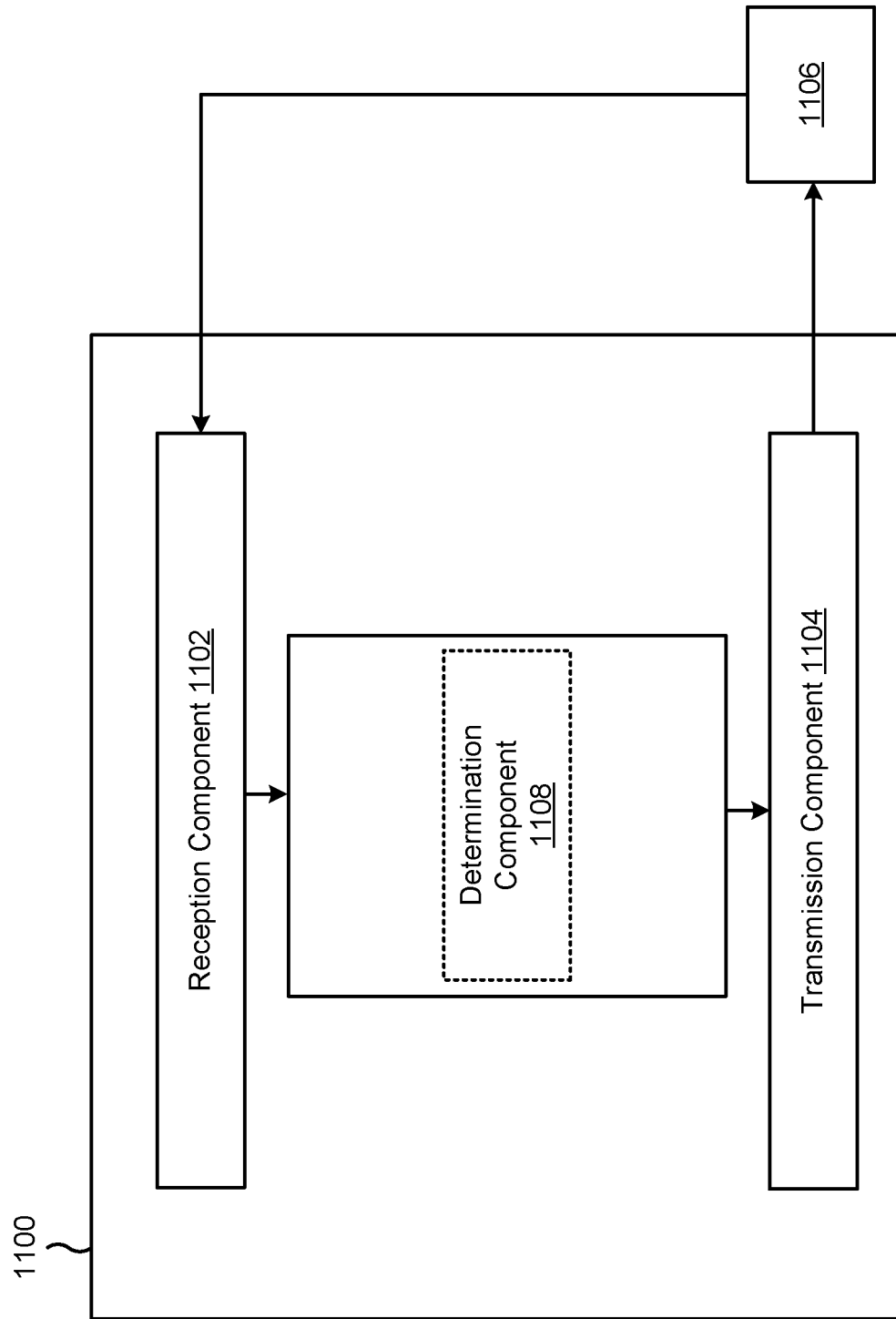

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104t. As further shown, the apparatus 1100 may include a determination component 1108, among other examples.

In some aspects, the apparatus 1100 may be configured to perform one or more operations described herein in connection with FIGS. 7A and 7B. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The determination component 1108 may determine, for a UE, SS configuration information that indicates one or more CC groups and an SS set group configuration for each CC group of the one or more CC groups. The transmission component 1104 may transmit, to the UE, the SS configuration information that enables the UE to perform SS set group switching on each CC included in a CC group of the one or more CC groups.

The transmission component 1104 may transmit, to the UE, an indication to switch SS set groups for the CC group from a first SS set group associated with the CC group to a second SS set group associated with the CC group, wherein the indication identifies at least one of a CC group index associated with the CC group, or an SS set group index associated with the second SS set group.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, search space (SS) configuration information that indicates one or more component carrier (CC) groups and an SS set group configuration for each CC group of the one or more CC groups; and receiving, from the base station, a physical downlink control channel (PDCCH) communication on a CC included in a CC group, of the one or more CC groups, wherein receiving the PDCCH communication is based at least in part on switching between SS set groups, associated with the CC group, on each CC included in the CC group.

Aspect 2: The method of Aspect 1, further comprising: monitoring, for each CC included in the CC group, a first SS set group indicated by an SS set group configuration associated with the CC group; and identifying an indication to switch SS set groups for the CC group; and monitoring, for each CC included in the CC group, a second SS set group indicated by the SS set group configuration based at least in part on the indication to switch SS set groups for the CC group.

Aspect 3: The method of any of Aspects 1-2, wherein receiving the SS configuration information comprises: receiving, for the CC group, an indication of one or more SS set groups associated with the CC group, wherein an SS set group, of the one or more SS set groups, indicates SS sets included in the SS set group for each active bandwidth part (BWP) combination of CCs included in the CC group.

Aspect 4: The method of any of Aspects 1-3, wherein receiving the SS configuration information comprises: receiving, for the CC group, the SS set group configuration, wherein the CC group includes a first CC and a second CC, and the SS set group configuration indicates a first SS set group and a second SS set group, and wherein the SS set group configuration indicates, for each active bandwidth part (BWP) combination of the first CC and the second CC: a first subgroup of one or more SS sets, associated with the first CC, that are included in the first SS set group, a second subgroup of one or more SS sets, associated with the second CC, that are included in the first SS set group, a third subgroup of one or more SS sets, associated with the first CC, that are included in the second SS set group, and a fourth subgroup of one or more SS sets, associated with the second CC, that are included in the second SS set group.

Aspect 5: The method of Aspect 4, wherein the first one or more SS sets and the second one or more SS sets are associated with a first one or more parameters, and wherein the third one or more SS sets and the fourth one or more SS sets are associated with a second one or more parameters.

Aspect 6: The method of any of Aspects 1-5, wherein receiving the SS configuration information comprises: receiving, for the CC group, an indication of CCs included in the CC group, wherein the CCs included in the CC group are based at least in part on a frequency band or a numerology associated with the CCs included in the CC group.

Aspect 7: The method of any of Aspects 1-6, further comprising: transmitting, to the base station, an indication of CCs to be included in the CC group via a UE capability message or a UE assistance information message.

Aspect 8: The method of any of Aspects 1-7, further comprising: receiving, from the base station, an indication to switch SS set groups for the CC group from a first SS set group associated with the CC group to a second SS set group associated with the CC group, wherein the indication identifies at least one of: a CC group index associated with the CC group, or an SS set group index associated with the second SS set group.

Aspect 9: A method of wireless communication performed by a base station, comprising: determining, for a user equipment (UE), search space (SS) configuration information that indicates one or more component carrier (CC) groups and an SS set group configuration for each CC group of the one or more CC groups; and transmitting, to the UE, the SS configuration information that enables the UE to perform SS set group switching on each CC included in a CC group of the one or more CC groups.

Aspect 10: The method of Aspect 9, wherein determining the SS configuration information comprises: determining, for the CC group, one or more SS set groups to be associated with the CC group; and determining, for an SS set group of the one or more SS set groups, one or more SS sets included in the SS set group for each active bandwidth part (BWP) combination of CCs included in the CC group.

Aspect 11: The method of any of Aspects 9-10, wherein determining the SS configuration information comprises: determining that CCs of the UE that are associated with a same frequency band or that have a same numerology are to be included in a same CC group.

Aspect 12: The method of any of Aspects 9-11, wherein determining the SS configuration information comprises: receiving, from the UE, an indication of CCs to be included in the one or more CC groups via a UE capability message or a UE assistance information message; and determining the one or more CC groups based at least in part on the indication of CCs to be included in the one or more CC groups.

Aspect 13: The method of any of Aspects 9-12, wherein determining the SS configuration information comprises: determining, for the CC group, an SS set group that includes a first SS set group and a second SS set group, wherein the CC group includes a first CC and a second CC; and determining, for each active BWP combination of the first CC and the second CC, that the SS set group includes: a first subgroup of one or more SS sets, associated with the first CC, that are included in the first SS set group, a second subgroup of one or more SS sets, associated with the second CC, that are included in the first SS set group, a third subgroup of one or more SS sets, associated with the first CC, that are included in the second SS set group, and a fourth subgroup of one or more SS sets, associated with the second CC, that are included in the second SS set group.

Aspect 14: The method of Aspect 9, wherein determining the SS configuration information comprises: determining, for an SS set group associated with the CC group, SS sets to be included in the SS set group based at least in part on one or more parameters associated with the SS sets.

Aspect 15: The method of Aspect 9, further comprising: transmitting, to the UE, an indication to switch SS set groups for the CC group from a first SS set group associated with the CC group to a second SS set group associated with the CC group, wherein the indication identifies at least one of: a CC group index associated with the CC group, or an SS set group index associated with the second SS set group.

Aspect 16: An apparatus for wireless communication at a device, comprising a processor; memory coupled with the processor; and instructions stored in the memory and executable by the processor to cause the apparatus to perform the method of one or more Aspects of Aspects 1-8.

Aspect 17: A device for wireless communication, comprising a memory and one or more processors coupled to the memory, the one or more processors configured to perform the method of one or more Aspects of Aspects 1-8.

Aspect 18: An apparatus for wireless communication, comprising at least one means for performing the method of one or more Aspects of Aspects 1-8.

Aspect 19: A non-transitory computer-readable medium storing code for wireless communication, the code comprising instructions executable by a processor to perform the method of one or more Aspects of Aspects 1-8.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-8.

Aspect 21: An apparatus for wireless communication at a device, comprising a processor; memory coupled with the processor; and instructions stored in the memory and executable by the processor to cause the apparatus to perform the method of one or more Aspects of Aspects 9-15.

Aspect 22: A device for wireless communication, comprising a memory and one or more processors coupled to the memory, the one or more processors configured to perform the method of one or more Aspects of Aspects 9-15.

Aspect 23: An apparatus for wireless communication, comprising at least one means for performing the method of one or more Aspects of Aspects 9-15.

Aspect 24: A non-transitory computer-readable medium storing code for wireless communication, the code comprising instructions executable by a processor to perform the method of one or more Aspects of Aspects 9-15.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 9-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
      receive, from a network entity, search space (SS) configuration information that indicates one or more component carrier (CC) groups and an SS set group configuration for each CC group of the one or more CC groups; and
      receive, from the network entity, a physical downlink control channel (PDCCH) communication on a first CC included in a CC group, of the one or more CC groups, the CC group including the first CC and a second CC different from the first CC, wherein receiving the PDCCH communication is based at least in part on switching, on the first CC and the second CC included in the CC group, from a first SS set group associated with the CC group to a second SS set group associated with the CC group.

2. The UE of claim 1, wherein the one or more processors are further configured to:
   monitor, for each CC included in the CC group, the first SS set group indicated by an SS set group configuration associated with the CC group;
   identify an indication to switch SS set groups for the CC group; and
   monitor, for each CC included in the CC group, the second SS set group indicated by the SS set group configuration based at least in part on the indication to switch SS set groups for the CC group.

3. The UE of claim 1, wherein the one or more processors are configured to, when receiving the SS configuration information:
   receive, for the CC group, an indication of one or more SS set groups associated with the CC group,
   wherein an SS set group, of the one or more SS set groups, indicates SS sets included in the SS set group for each active bandwidth part (BWP) combination of CCs included in the CC group.

4. The UE of claim 1, wherein the one or more processors are configured to, when receiving the SS configuration information:
   receive, for the CC group, an SS set group configuration that indicates the first SS set group and the second SS set group,
   wherein the SS set group configuration indicates, for each active bandwidth part (BWP) combination of the first CC and the second CC included in the CC group:
      a first subgroup of one or more SS sets, associated with the first CC, that are included in the first SS set group,
      a second subgroup of one or more SS sets, associated with the second CC, that are included in the first SS set group, a third subgroup of one or more SS sets, associated with the first CC, that are included in the second SS set group, and a fourth subgroup of one or more SS sets, associated with the second CC, that are included in the second SS set group.

5. The UE of claim 4, wherein the first subgroup and the second subgroup are associated with a first one or more parameters, and wherein the third subgroup and the fourth subgroup are associated with a second one or more parameters.

6. The UE of claim 1, wherein the one or more processors are configured to, when receiving the SS configuration information:

receive, for the CC group, an indication of CCs included in the CC group, wherein the CCs included in the CC group are based at least in part on a frequency band or a numerology associated with the CCs included in the CC group.

7. The UE of claim 1, wherein the one or more processors are further configured to:

transmit, to the network entity, an indication of CCs to be included in the CC group via a UE capability message or a UE assistance information message.

8. The UE of claim 1, wherein the one or more processors are further configured to:

receive, from the network entity, an indication to switch SS set groups for the CC group from the first SS set group associated with the CC group to the second SS set group associated with the CC group, wherein the indication identifies at least one of:

a CC group index associated with the CC group, or an SS set group index associated with the second SS set group.

9. A method of wireless communication performed by a user equipment (UE), comprising:

receiving, from a network entity, search space (SS) configuration information that indicates one or more component carrier (CC) groups and an SS set group configuration for each CC group of the one or more CC groups; and receiving, from the network entity, a physical downlink control channel (PDCCH) communication on a first CC included in a CC group, of the one or more CC groups, the CC group including the first CC and a second CC different from the first CC, wherein receiving the PDCCH communication is based at least in part on switching, on the first CC and the second CC included in the CC group, from a first SS set group associated with the CC group to a second SS set group associated with the CC group.

10. The method of claim 9, further comprising:

monitoring, for each CC included in the CC group, the first SS set group indicated by the SS set group configuration associated with the CC group; and identifying an indication to switch SS set groups for the CC group; and monitoring, for each CC included in the CC group, the second SS set group indicated by the SS set group configuration based at least in part on the indication to switch SS set groups for the CC group.

11. The method of claim 9, wherein receiving the SS configuration information comprises:

receiving, for the CC group, an indication of one or more SS set groups associated with the CC group, wherein an SS set group, of the one or more SS set groups, indicates SS sets included in the SS set group for each active bandwidth part (BWP) combination of CCs included in the CC group.

12. The method of claim 9, wherein receiving the SS configuration information comprises:

receiving, for the CC group, an SS set group configuration that indicates the first SS set group and the second SS set group, wherein the SS set group configuration indicates, for each active bandwidth part (BWP) combination of the first CC and the second CC included in the CC group:

a first subgroup of one or more SS sets, associated with the first CC, that are included in the first SS set group, a second subgroup of one or more SS sets, associated with the second CC, that are included in the first SS set group, a third subgroup of one or more SS sets, associated with the first CC, that are included in the second SS set group, and a fourth subgroup of one or more SS sets, associated with the second CC, that are included in the second SS set group.

13. The method of claim 12, wherein the first subgroup and the second subgroup are associated with a first one or more parameters, and wherein the third subgroup and the fourth subgroup are associated with a second one or more parameters.

14. The method of claim 9, wherein receiving the SS configuration information comprises:

receiving, for the CC group, an indication of CCs included in the CC group, wherein the CCs included in the CC group are based at least in part on a frequency band or a numerology associated with the CCs included in the CC group.

15. The method of claim 9, further comprising:

transmitting, to the network entity, an indication of CCs to be included in the CC group via a UE capability message or a UE assistance information message.

16. The method of claim 9, further comprising:

receiving, from the network entity, an indication to switch SS set groups for the CC group from the first SS set group associated with the CC group to the second SS set group associated with the CC group, wherein the indication identifies at least one of:

a CC group index associated with the CC group, or an SS set group index associated with the second SS set group.

17. A network entity for wireless communication, comprising:

a memory; and one or more processors coupled to the memory, the one or more processors configured to:

determine, for a user equipment (UE), search space (SS) configuration information that indicates one or more component carrier (CC) groups and an SS set group configuration for each CC group of the one or more CC groups; and transmit, to the UE, the SS configuration information that enables the UE to perform SS set group switching, on each CC included in a CC group of the one or more CC groups, from a first SS set group associated with the CC group to a second SS set group associated with the CC group, the CC group including a first CC and a second CC different from the first CC.

18. The network entity of claim 17, wherein the one or more processors are configured to, when determining the SS configuration information:
  determine, for the CC group, one or more SS set groups to be associated with the CC group; and
  determine, for an SS set group of the one or more SS set groups, one or more SS sets included in the SS set group for each active bandwidth part (BWP) combination of CCs included in the CC group.

19. The network entity of claim 17, wherein the one or more processors are configured to, when determining the SS configuration information:
  determine that CCs of the UE that are associated with a same frequency band or that have a same numerology are to be included in a same CC group.

20. The network entity of claim 17, wherein the one or more processors are configured to, when determining the SS configuration information:
  receive, from the UE, an indication of CCs to be included in the one or more CC groups via a UE capability message or a UE assistance information message; and
  determine the one or more CC groups based at least in part on the indication of CCs to be included in the one or more CC groups.

21. The network entity of claim 17, wherein the one or more processors are configured to, when determining the SS configuration information:
  determine, for the CC group, an SS set group configuration that includes the first SS set group and the second SS set group; and
  determine, for each active BWP combination of the first CC and the second CC, that the SS set group configuration includes:
    a first subgroup of one or more SS sets, associated with the first CC, that are included in the first SS set group,
    a second subgroup of one or more SS sets, associated with the second CC, that are included in the first SS set group,
    a third subgroup of one or more SS sets, associated with the first CC, that are included in the second SS set group, and
    a fourth subgroup of one or more SS sets, associated with the second CC, that are included in the second SS set group.

22. The network entity of claim 17, wherein the one or more processors are configured to, when determining the SS configuration information:
  determine, for an SS set group associated with the CC group, SS sets to be included in the SS set group based at least in part on one or more parameters associated with the SS sets.

23. The network entity of claim 17, wherein the one or more processors are further configured to:
  transmit, to the UE, an indication to switch SS set groups for the CC group from the first SS set group associated with the CC group to the second SS set group associated with the CC group, wherein the indication identifies at least one of:
    a CC group index associated with the CC group, or
    an SS set group index associated with the second SS set group.

24. A method of wireless communication performed by a network entity, comprising:
  determining, for a user equipment (UE), search space (SS) configuration information that indicates one or more component carrier (CC) groups and an SS set group configuration for each CC group of the one or more CC groups; and
  transmitting, to the UE, the SS configuration information that enables the UE to perform SS set group switching, on each CC included in a CC group of the one or more CC groups, from a first SS set group associated with the CC group to a second SS set group associated with the CC group, the CC group including a first CC and a second CC different from the first CC.

25. The method of claim 24, wherein determining the SS configuration information comprises:
  determining, for the CC group, one or more SS set groups to be associated with the CC group; and
  determining, for an SS set group of the one or more SS set groups, one or more SS sets included in the SS set group for each active bandwidth part (BWP) combination of CCs included in the CC group.

26. The method of claim 24, wherein determining the SS configuration information comprises:
  determining that CCs of the UE that are associated with a same frequency band or that have a same numerology are to be included in a same CC group.

27. The method of claim 24, wherein determining the SS configuration information comprises:
  receiving, from the UE, an indication of CCs to be included in the one or more CC groups via a UE capability message or a UE assistance information message; and
  determining the one or more CC groups based at least in part on the indication of CCs to be included in the one or more CC groups.

28. The method of claim 24, wherein determining the SS configuration information comprises:
  determining, for the CC group, an SS set group configuration that includes the first SS set group and the second SS set group; and
  determining, for each active BWP combination of the first CC and the second CC, that the SS set group configuration includes:
    a first subgroup of one or more SS sets, associated with the first CC, that are included in the first SS set group,
    a second subgroup of one or more SS sets, associated with the second CC, that are included in the first SS set group,
    a third subgroup of one or more SS sets, associated with the first CC, that are included in the second SS set group, and
    a fourth subgroup of one or more SS sets, associated with the second CC, that are included in the second SS set group.

29. The method of claim 24, wherein determining the SS configuration information comprises:
  determining, for an SS set group associated with the CC group, SS sets to be included in the SS set group based at least in part on one or more parameters associated with the SS sets.

30. The method of claim 24, further comprising:
  transmitting, to the UE, an indication to switch SS set groups for the CC group from the first SS set group associated with the CC group to the second SS set group associated with the CC group, wherein the indication identifies at least one of:
    a CC group index associated with the CC group, or an SS set group index associated with the second SS set group.

* * * * *